(12) United States Patent
Lemmens et al.

(10) Patent No.: US 9,906,047 B2
(45) Date of Patent: Feb. 27, 2018

(54) CIRCUITRY FOR INDUCTIVE POWER TRANSFER

(71) Applicant: Access Business Group International LLC, Ada, MI (US)

(72) Inventors: Willy Henri Lemmens, Heverlee (BE); David Martin Pooley, Cambridgeshire (GB); John De Clercq, Lede (BE)

(*) Notice: Subject to any disclaimer, the term of this patent is extended or adjusted under 35 U.S.C. 154(b) by 539 days.

(21) Appl. No.: 14/510,554

(22) Filed: Oct. 9, 2014

(65) Prior Publication Data

US 2015/0054354 A1    Feb. 26, 2015

Related U.S. Application Data

(63) Continuation of application No. 13/209,584, filed on Aug. 15, 2011, now Pat. No. 8,884,469, which is a
(Continued)

(30) Foreign Application Priority Data

Dec. 21, 2007  (GB) .................................. 0724981.6
Dec. 21, 2007  (GB) .................................. 0724982.4

(51) Int. Cl.
  *H01F 27/42*   (2006.01)
  *H01F 37/00*   (2006.01)
  (Continued)

(52) U.S. Cl.
  CPC ............. *H02J 5/005* (2013.01); *B60L 11/182* (2013.01); *B60L 11/1824* (2013.01);
  (Continued)

(58) Field of Classification Search
  CPC .. H02J 17/00; H02J 7/025; H02J 5/005; H02J 50/00; H02J 50/90; H01F 38/14
  (Continued)

(56) References Cited

U.S. PATENT DOCUMENTS 5,202,664 A    4/1993  Poulsen
6,356,198 B1   3/2002  Wuidart et al.
(Continued)

FOREIGN PATENT DOCUMENTS

EP    0298707    1/1989
EP    0903830    3/1999
(Continued)

OTHER PUBLICATIONS

Merritt, Purcell, Stroink; "Uniform Magnetic Field Produced by Three, Four, and Five Square Coils;" Rev. Sci. Instrum.; Jul. 1983; pp. 879-882; vol. 54 No. 7.
(Continued)

*Primary Examiner* — Carlos Amaya
(74) *Attorney, Agent, or Firm* — Warner Norcross & Judd LLP

(57) ABSTRACT

Circuitry for use in a primary unit of an inductive power transfer system to generate an electromagnetic field so as to transfer power wirelessly by electromagnetic induction to one or more secondary units of the system, the or each secondary unit being separable from the primary unit, the circuitry comprising: a plurality of drivable portions, each portion comprising a primary coil or a dummy coil; driving means operable to supply both or at least two of said portions with drive signals so as to cause those driven portions that have a said primary coil to generate said electromagnetic field; and control means operable, in dependence upon a feedback signal indicative of a characteristic of the primary or dummy coil of one or more of the driven portions, to control the circuitry so as to tend to regulate said feedback signal, wherein the circuitry is configured so that; those portions that are driven are connected together in parallel and have a tuned resonant response; and said control tends to regulate such a characteristic of each of said driven coils.

24 Claims, 24 Drawing Sheets

Related U.S. Application Data continuation of application No. 12/808,490, filed as application No. PCT/GB2008/004206 on Dec. 18, 2008, now Pat. No. 8,884,468.

(51) Int. Cl.

| | |
|---|---|
| *H01F 38/00* | (2006.01) |
| *H02J 5/00* | (2016.01) |
| *H02J 7/02* | (2016.01) |
| *H01F 38/14* | (2006.01) |
| *B60L 11/18* | (2006.01) |
| *H02J 7/00* | (2006.01) |
| *H02J 7/04* | (2006.01) |

(52) U.S. Cl.
CPC .......... *H01F 38/14* (2013.01); *H02J 7/0029* (2013.01); *H02J 7/025* (2013.01); *H02J 7/045* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/14* (2013.01); *Y02T 90/168* (2013.01); *Y04S 30/12* (2013.01); *Y10T 307/297* (2015.04); *Y10T 307/461* (2015.04); *Y10T 307/625* (2015.04); *Y10T 307/735* (2015.04)

(58) Field of Classification Search
USPC ........................................................ 307/104
See application file for complete search history.

(56) References Cited

U.S. PATENT DOCUMENTS

| | | |
|---|---|---|
| 6,515,878 B1 | 2/2003 | Meins et al. |
| 6,548,985 B1 | 4/2003 | Hayes et al. |
| 6,650,213 B1 | 11/2003 | Sakurai et al. |
| 6,803,744 B1 | 10/2004 | Sabo |
| 6,906,495 B2 | 6/2005 | Cheng et al. |
| 7,164,255 B2 | 1/2007 | Hui |
| 7,432,622 B2 | 10/2008 | Griepentrog et al. |
| 7,518,337 B2 | 4/2009 | Beart et al. |
| 7,576,514 B2 | 8/2009 | Hui |
| 7,868,482 B2 | 1/2011 | Greene et al. |
| 2004/0000974 A1 | 1/2004 | Odenaal et al. |
| 2004/0130916 A1 | 7/2004 | Baarman |
| 2005/0212634 A1 | 9/2005 | Baldwin et al. |
| 2007/0287508 A1 | 12/2007 | Telefus |
| 2008/0278112 A1 | 11/2008 | Hui et al. |
| 2009/0015197 A1 | 1/2009 | Sogabe et al. |
| 2009/0033280 A1 | 2/2009 | Choi et al. |
| 2009/0108805 A1 | 4/2009 | Liu et al. |
| 2009/0230777 A1 | 9/2009 | Baarman et al. |
| 2010/0109443 A1 | 5/2010 | Cook et al. |
| 2010/0190435 A1 | 7/2010 | Cook et al. |
| 2010/0259108 A1 | 10/2010 | Giler et al. |
| 2010/0328044 A1 | 12/2010 | Waffenschmidt et al. |
| 2012/0007437 A1 | 1/2012 | Fells et al. |

FOREIGN PATENT DOCUMENTS

| | | |
|---|---|---|
| EP | 1022840 | 7/2000 |
| EP | 2211438 | 7/2010 |
| GB | 2117579 | 10/1983 |
| GB | 2388716 | 11/2003 |
| GB | 2389720 | 12/2003 |
| JP | H08-340650 | 12/1996 |
| JP | 10-285087 | 10/1998 |
| JP | 11-095922 | 4/1999 |
| JP | 11-298368 | 10/1999 |
| JP | H11-298368 | 10/1999 |
| JP | 2000-148932 | 5/2000 |
| JP | 2000-228637 | 8/2000 |
| JP | 2000-270501 | 9/2000 |
| WO | 95/11544 | 4/1995 |
| WO | 95/11545 | 4/1995 |
| WO | 01/16995 | 3/2001 |
| WO | 03/105308 | 12/2003 |
| WO | 2005/109597 | 11/2005 |
| WO | 2005/109598 | 11/2005 |
| WO | 2006/022365 | 3/2006 |
| WO | 2007/042953 | 4/2007 |
| WO | 2007/146223 | 12/2007 |
| WO | 2008/035248 | 3/2008 |
| WO | 2008/137996 | 11/2008 |
| WO | 2009/027674 | 3/2009 |
| WO | 2009/040807 | 4/2009 |
| WO | 2009/047768 | 4/2009 |
| WO | 2009/081115 | 7/2009 |
| WO | 2009/081126 | 7/2009 |
| WO | 2009/116025 | 9/2009 |
| WO | 2009/147664 | 12/2009 |

OTHER PUBLICATIONS

Achterberg, Lomonova, De Boeij; "Coil Array Structures Compared for Contactless Battery Charging Platform;" IEEE Transactions on Magnetics; May 2008; pp. 617-622; vol. 44, No. 5.

Hui, Ho; "A New Generation of Universal Contactless Battery Charging Platform for Portable Consumer Electronic Equipment;" 35th Annual IEEE Power Electronics Specialists Conference; 2004; pp. 638-644.

Sasada; "Three-Coil System for Producing Uniform Magnetic Fields;" Journal of the Magnetics Socitey of Japan; 2002; Abstract; vol. 27 No. 4.

Hatanaka, Sato, Matsuki, Kikuchi, Murakami, Kawase, Satoh; "Excited Composition of Primary Side in a Position-Free Contactless Power Station System," 2002; pp. 580-584; vol. 26 No. 4.

Matsuki, Kikuchi, Murakami, Satoh, Hatanaka, Sato; "Power Transmission of a Desk With a Cord-Free Power Supply," IEEE Transactions on Magnetics; Sep. 2002; pp. 3329-3331; vol. 38 No. 5.

Marder; "The Physics of SERAPHIM," Sandia National Laboratories; Oct. 2001.

Hatanaka, Sato, Matsuki, Kikuchi, Murakami, Satoh; "Coil Shape in a Desk-Type Contactless Power Station System," Jan. 24, 2001; pp. 1015-1018; vol. 25 No. 4-2.

Sato, Adachi, Matsuki, Kikuchi; "The Optimum Design of Open Magnetic Circuit Meander Coil for Contactless Power Station System," Digest of INTERMAG 99; May 1999; pp. GR09-GR09.

Tang, Hui, Chung; "Characterization of Coreless Printed Circuit Board (PCB) Transformers;" 1999; pp. 746-752.

Pedder, Brown, Skinner; "A Contactless Electrical Energy Transmission System," IEEE Transactions on Industrial Electronics; Feb. 1999; pp. 23-30; vol. 46 No. 1.

Sato, Murakami, Suzuki, Matsuki, Kikuchi, Harakawa, Osada, Seki; "Contactless Energy Transmission to Mobile Loads by CLPS—Test Driving of an EV with Starter Batteries;" Sep. 1997; pp. 4203-4205; vol. 33 No. 5.

Murakami, Sato, Watanabe, Matsuki, Kikuchi, Harakawa, Satoh; "Consideration on Cordless Power Station-Contactless Power Transmission System;" IEEE Transactions on Magnetics; Sep. 1996; pp. 5037-5039; vol. 32 No. 5.

Sato, Murakami, Matsuki, Kikuchi, Harakawa, Satoh; "Stable Energy Transmission to Moving Loads Utilizing New CLPS;" IEEE Transactions on Magnetics; Sep. 1996; pp. 5034-5036; vol. 32 No. 5.

Donig, Melbert, Scheckel, Schon; "An Interface Circuit for Contactless Power and Data Transmission for Chipcard and Identification Systems;" Solid-State Circuits Conference, 1991; Sep. 1991; pp. 61-64; vol. 1.

Abel, Third; "Contactless Power Transfer—An Exercise in Topology;" IEEE Transactions on Magnetics; Sep. 1984; pp. 1813-1815; vol. 20 Issue 5.

Carter; "Coil-System Design for Production of Uniform Magnetic Fields;" Proceedings of the Institution of Electrical Engineers; Nov. 1976; pp. 1279-1283; vol. 123 No. 11.

(56) References Cited

OTHER PUBLICATIONS

Written Opinion of the International Searching Authority, International Application No. PCT/GB2008/04206, International Filing Date Dec. 18, 2008.

Joep Jacobs, Andreas Averberg and Rik De Doncker, Multi-Phase Series Resonant DC-to-DC-Converters: Stationary Investigations, Power Electronics Specialists Conference, 2005, Jan. 1, 2005, pp. 660-666.

International Search Report, International Application No. PCT/GB2008/004189, International Filing Date Dec. 18, 2008.

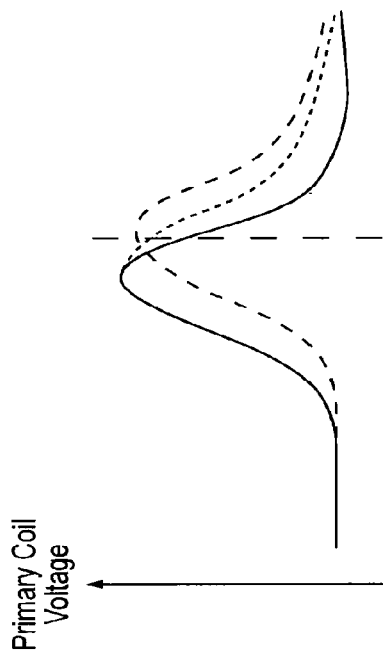
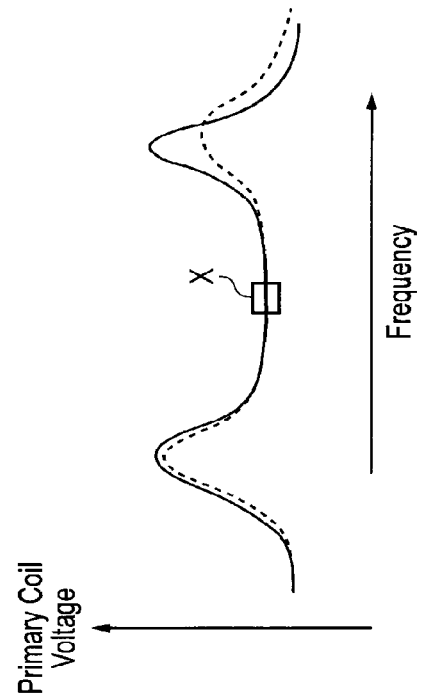
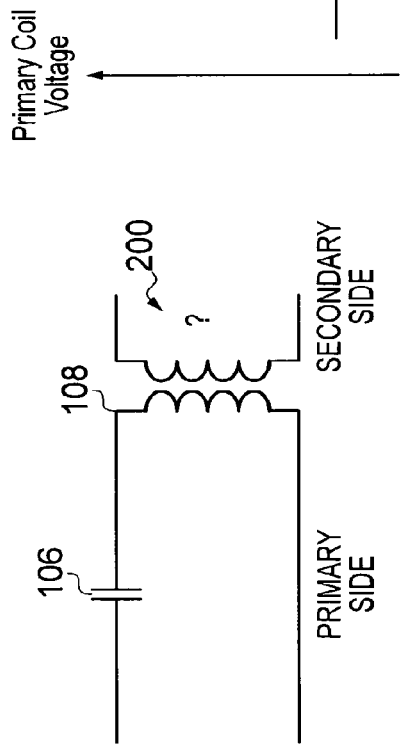
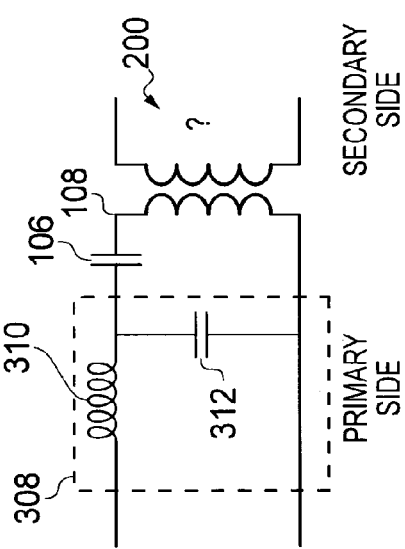

CIRCUITRY FOR INDUCTIVE POWER TRANSFER

The present invention relates to circuitry for use in inductive power transfer systems, for example, to power portable electrical or electronic devices.

Inductive power transfer systems suitable for powering portable devices may consist of two parts:

A primary unit having at least one primary coil, through which it drives an alternating current, creating a time-varying magnetic flux.

A secondary unit, separable from the primary unit, having a secondary coil.

When the secondary coil is placed in proximity to the time-varying flux created by the primary coil, the varying flux induces an alternating current in the secondary coil, and thus power may be transferred inductively from the primary unit to the secondary unit.

Generally, the secondary unit supplies the transferred power to an external load, and the secondary unit may be carried in or by a host object (a secondary device) which includes the load. For example, the host object may be a portable, electrical or electronic device having a rechargeable battery or cell. In this case, the load may be a battery charger circuit for charging the battery or cell. As another option, the secondary unit may be incorporated in such a rechargeable cell or battery (secondary device), together with a suitable battery charger circuit.

It is desirable for a primary unit in such systems to have a plurality of primary coils, for example to transfer power to a plurality of secondary units simultaneously or to provide such secondary units with positional freedom of placement relative to the primary unit. That is, it is desirable to transfer power to two or more secondary units simultaneously with a single primary unit. A 1:1 relationship between primary coil and secondary unit is not essential, and the present invention extends to the use of more than one primary coil to transfer power to a secondary unit.

It is known to provide a primary unit in an inductive power transfer system with a plurality of primary coils. However, a number of cost-, performance- and complexity-related disadvantages have been identified in relation to circuitry in such known primary units, and indeed with primary units having a single primary coil. It is accordingly desirable to provide circuitry for use in primary units which does not suffer from one or more of the identified disadvantages, and primary units and inductive power transfer systems including such circuitry. It is also desirable to provide a primary unit in which multiple primary coils can be driven and controlled efficiently without having to significantly reproduce copies of the circuitry required to drive and control a single primary coil. It is also desirable to provide a primary unit whose circuitry is desensitised to changes in its relationship with a secondary unit, or, for example, to differences between one secondary unit and the next.

According to an embodiment of a first aspect of the present invention, there is provided circuitry for use in a primary unit of an inductive power transfer system to generate an electromagnetic field so as to transfer power wirelessly by electromagnetic induction to one or more secondary units of the system, the or each secondary unit being separable from the primary unit, the circuitry including: a plurality of drivable portions, each portion including a primary coil or a dummy coil; driving means (e.g. driving circuitry) operable to supply both or at least two of said portions with drive signals so as to cause those driven portions that have a said primary coil to generate said electromagnetic field; and control means (e.g. control circuitry) operable, in dependence upon a feedback signal indicative of a characteristic of the primary or dummy coil of one or more of the driven portions, to control the circuitry so as to tend to regulate said feedback signal, wherein the circuitry is configured so that: those portions that are driven are connected together in parallel and have a tuned resonant response; and said control tends to regulate such a characteristic of each of said driven coils.

The characteristic (e.g. an electrical characteristic) of such a coil may be a magnitude of a coil signed over that coil, or a characteristic which varies as a function of a magnitude of a coil signal over that coil.

The portions may be permanently connected together in parallel, or may be connectable together in parallel temporarily for driving, for example with switches. The feedback-based control may be, for example, carried out by means of a microprocessor unit, which may also carry out control of such switches.

In one embodiment, each drivable portion includes substantially only its said primary coil or dummy coil. Such an embodiment may be advantageous in terms of needing minimum replication of circuitry to increase the number of primary or dummy coils. Minimising replication may be beneficial in cost terms, and may enable elegant control as compared to replicating drive and control circuitry.

The feedback signal may be indicative of a magnitude of a voltage or power signal commonly over the coils of the driven portions.

The circuitry may include a capacitance configured to be commonly connected in series with those portions that are driven. Such a capacitance may effectively tune the portions to have a resonant response.

The circuitry may be configured such that, during a driving period: the drive signals have a particular fundamental frequency; the capacitance has a particular capacitance value; and the portions that are driven have a combined particular (self) inductance value. The circuitry may be configured such that, during the driving period, the portions that are driven always have substantially the combined particular (self) inductance value. Such circuitry may be considered elegant in its design, and such embodiments may be considered beneficial in cost terms.

Those portions that are driven during one interval of the driving period in one embodiment are not the same portions that are driven during another such interval of the driving period. In such an embodiment, it may be possible to selectively drive different portions at different times. For example, if such portions are provided in an array, portions in a part of the array corresponding to the location of a secondary unit to be supplied power to may be selectively driven.

The particular capacitance value may be such that the portions that are driven are resonant at the particular fundamental frequency. That is, in one embodiment the particular capacitance value may be chosen such that the circuitry is resonant at the particular fundamental frequency when a particular number of portions are driven simultaneously. The capacitance may have a fixed capacitance value and the drive signals may have a fixed fundamental frequency.

The portions may be configured to have substantially the same inductance as one another, and the circuitry may be configured such that the number of portions driven during one interval of the driving period is the same as the number of portions driven during another interval of the driving period. In this scenario, the number of primary coils driven may differ over time, with the number of dummy coils driven varying over time in a corresponding manner. For example, it may be desirable to vary which primary coils are driven (and even the number of them that are driven) at a particular time in dependence upon the position/orientation of one or more secondary units relative to an array of such primary coils in the primary unit. When it is desirable to drive fewer primary coils, it may be desirable to drive more dummy coils to compensate for the drop in number of driven primary coils.

In one embodiment, the circuitry may be configured such that those portions that are driven have in common a frequency response having two main resonant peaks and a substantially flat portion therebetween, or some other response with a substantially flat portion, which portion does not vary significantly with changing effective inductance in the circuitry due to coupling between a primary coil and a secondary unit. In such an embodiment, the drive signals may have a fundamental frequency positioned in that flat portion.

Those portions that are driven may be configured such that they are connected in common with a series capacitance and a ballast circuit (for example, an LC ballast circuit), and the series capacitance and ballast circuit may be configured such that those portions that are driven have in common such a frequency response.

The circuitry may be configured such that those portions that are driven have a combined inductance $L_1$, and such that the series capacitance has a capacitance $C_1$, and such that the values of $L_1$ and $C_1$ are configured so that $f_0=1/(2\pi\sqrt{L_1C_1})$, where $f_0$ is the fundamental frequency.

The ballast circuit may have an inductance $L_2$ in series with the capacitance $C_1$ and a capacitance $C_2$ in parallel with the series-connected capacitance $C_1$ and inductance $L_1$, and the values of $L_2$ and $C_2$ may be configured such that $f_0=1/(2\pi\sqrt{L_2C_2})$, where $f_0$ is the fundamental frequency.

The values $L_1$ and $L_2$ may be configured such that two main resonant peaks are sufficiently far apart in frequency such that an effect of changes of effective inductance experienced due to coupling between a said primary coil and a said secondary unit on operation of the circuitry is substantially small. This may render such circuitry effectively stable given changes on the secondary side, and able to operate stably despite component tolerances. The values $L_1$ and $L_2$ may be configured such that $L_1/L_2=4$, approximately.

In one embodiment, each drivable portion may be configured such that, when driven, it has a frequency response having two main resonant peaks and a substantially flat portion therebetween, or some other response with a substantially flat portion, which portion does not vary significantly with changing effective inductance in the circuitry due to coupling between a primary coil and a secondary unit. In such an embodiment, the drive signals may have a fundamental frequency positioned in that flat portion.

The drivable portions may be configured to have substantially the same such frequency responses as one another, when driven. This may lead to simplicity in design and control, and thus to a low-cost embodiment. The drivable portions may, for example, have substantially the same configuration as one another. Each drivable portion may include a capacitance in series with its coil, and a ballast circuit (such as an LC ballast circuit), and, for each such drivable portion, its coil, its series capacitance and its ballast circuit may be configured such that that drivable portion has such a frequency response when driven. For example, the inductance of a primary coil (or each primary coil) may be substantially the same as the inductance of a dummy coil (or each dummy coil), the series capacitances in the drivable portions may be substantially the same as one another, the ballast circuits in the drivable portions may be substantially the same as one another, and the coils, the series capacitances and the ballast circuits may be configured in substantially the same way in each of the drivable portions.

For each driveable portion, the coil may have an inductance $L_1$ and the series capacitance may have a capacitance $C1$, and the values of $L_1$ and $C_1$ may be configured such that $f_0=1/(2\pi\sqrt{L_1C_1})$, where $f_0$ is said fundamental frequency. For each drivable portion, the ballast circuit may have an inductance $L_2$ in series with the capacitance $C_1$ and a capacitance $C_2$ in parallel with the series-connected capacitance $C_1$ and coil, and the values of $L_2$ and $C_2$ may be configured such that $f_0=1/(2\pi\sqrt{L_2C_2})$, where $f_0$ is the fundamental frequency.

For each said drivable portion, the values $L_1$ and $L_2$ may be configured such that the two main resonant peaks are sufficiently far apart in frequency such that an effect of changes of effective inductance experienced due to coupling between its coil and a secondary unit on operation of that portion is substantially small. This may render the portions effectively stable given changes on the secondary side, and able to operate stably despite component tolerances. The values $L_1$ and $L_2$ may be configured such that $L_1/L_2=4$, approximately.

The circuitry may be configured such that the feedback signal is obtained from only one of the portions that are driven. The feedback signal may be indicative of a voltage or current or power signal over the primary coil or dummy coil of that portion. It is advantageous to only need a feedback signal from one of the portions, in terms of simplicity of control circuitry, and thus minimisation of cost.

The circuitry may be configured such that a separate such feedback signal is obtained from each of the portions that are driven, and the control means may be operable to carry out its control in dependence on one or more of the feedback signals. The control means may be operable to carry out its control in dependence upon all of the feedback signals, or any subset of those signals, optionally in dependence upon the number and/or position/orientation of secondary units receiving power from the circuitry.

In one embodiment, the circuitry may be configured such that a separate such feedback signal is obtained from each of the portions that are driven and/or from the or each secondary unit receiving power inductively from the circuitry, each or each but one of the drivable portions may include a controllable element, and the control means may be operable in response to the feedback signals to carry out its control by controlling the controllable elements.

Separate control per portion, or control of the portions relative to one another, may be provided by such an embodiment. For example, the control means may be operable to employ the controllable elements to regulate the characteristics of (e.g. the coil signals over) the driven coils relative to one another.

The or each controllable element may be a variable reactance. The or each controllable element may be a variable capacitance. The or each controllable element may be operable under such control to vary a fundamental frequency of the drive signal in its portion. The or each controllable element may be a tuneable inverter or half-bridge circuit.

Each drivable portion may have a capacitance in series with its coil, which may be such a controllable element.

The or each dummy coil may be an inductor which, when driven, does not generate an electromagnetic field. Such an inductor may be shielded or designed not to radiate when driven. The inductance of a dummy coil (or each dummy coil) may be substantially the same as the inductance of a primary coil (or each primary coil).

The coils when driven may have the same polarity as one another, or one or more of them may have a different polarity from one or more others of them.

According to an embodiment of a second aspect of the present invention, there is provided circuitry for use in a primary unit of an inductive power transfer system to generate a time-varying electromagnetic field so as to transfer power wirelessly by electromagnetic induction to a secondary unit of the system, the secondary unit being separable from the primary unit, the circuitry including: a drivable portion including a primary coil; and driving means (e.g. driving circuitry) operable to supply the drivable portion with a drive signal having a predetermined fundamental frequency so as to cause the primary coil to generate said electromagnetic field, wherein: the drivable portion is configured such that, when driven it has a frequency response having two main resonant peaks and a substantially flat portion therebetween, or some other response with a substantially flat portion, which portion does not vary significantly with changing effective inductance in the circuitry due to coupling between the primary coil and a said secondary unit; and the driving means is configured such that said fundamental frequency is positioned in frequency between said main resonant peaks and in said flat portion.

The portion, when driven, may be configured such that its primary coil is connected in series with a capacitance and to a ballast circuit (for example, an LC ballast circuit), and the primary coil, series capacitance and ballast circuit may be configured to have such a frequency response when driven.

The primary coil may have an inductance (self-inductance) $L_1$ and the series capacitance may have a series capacitance $C_1$, and the values of $L_1$ and $C_1$ may be configured such that $f_0=1/(2\pi\sqrt{L_1C_1})$, where $f_0$ is the fundamental frequency. The ballast circuit may have an inductance $L_2$ in series with the capacitance $C_1$ and a capacitance $C_2$ in parallel with the series-connected capacitance $C_1$ and the primary coil, when the drivable portion is driven, and the values of $L_2$ and $C_2$ may be configured such that $f_0=1/(2\pi\sqrt{L_2C_2})$, where $f_0$ is the fundamental frequency.

The values $L_1$ and $L_2$ may be configured such that the two main resonant peaks are sufficiently far apart in frequency such that an effect of changes of effective inductance experienced due to coupling between the primary coil and a said secondary unit on operation of the circuitry is substantially small. This may render such circuitry effectively stable given changes on the secondary side, and able to operate stably despite component tolerances. The values $L_1$ and $L_2$ may be configured such that $L_1/L_2=4$, approximately.

According to an embodiment of a third aspect of the present invention, there is provided a primary unit for use in an inductive power transfer system, including circuitry according to the aforementioned first or second aspect of the present invention.

According to an embodiment of a fourth aspect of the present invention, there is provided an inductive power transfer system, including: a primary unit operable to generate an electromagnetic field; and at least one secondary unit, separable from the primary unit, configured to receive power wirelessly by electromagnetic induction from the primary unit when in proximity thereto, wherein the primary unit includes circuitry according to the aforementioned first or second aspect of the present invention.

It is envisaged that circuitry embodying the present invention may be configured in a form not having said coils, such that said coils may be added at a later time in time for use. The present invention therefore extends to aspects of the present invention corresponding respectively to the aforementioned aspects, not having such coils but being configured to be connected thereto.

The present invention may be extended to method aspects corresponding in scope to the aforementioned circuitry, primary unit and inductive power transfer system aspects.

According to a further aspect of the invention there is provided a primary unit for charging a secondary device, separable from the primary unit by electromagnetic induction, the primary unit including: at least two primary coils; an alternating voltage or current source, coupled to the at least two primary coils; a voltage or current or power sensor; wherein the primary unit measures the voltage, current, or power in at least one coil and adjusts the magnitude of the alternating voltage or current source, so as to maintain the at least two coils at substantially the same voltage, current or power.

According to a further aspect of the invention there is provided a method for charging a secondary device, separable from the primary unit, by electromagnetic induction, the method including the steps of: providing at least two primary coils; sensing the voltage, current or power at the primary coils; adjusting the voltage or current source, such that the two primary coils are maintained at substantially the same voltage, current or power.

According to a further aspect of the invention there is provided a primary unit for charging a secondary device, separable from the primary unit by electromagnetic induction, the primary unit including: at least two primary coils; an alternating voltage or current source coupled to the at least two primary coils; at least one variable impedance coupled to at least one primary coil; a voltage or current or power sensor; wherein the primary unit measures the voltage, current, or power in at least one coil and adjusts the variable impedance to vary the voltage, current, or power in the coil independently of the other coil.

According to a further aspect of the invention there is provided a method for charging a secondary device, separable from the primary unit, by electromagnetic induction, the primary unit including the steps of: providing at least two primary coils, supplying voltage, current or power to the at least two primary coils, and varying the impedance coupled to one of the coils such that the voltage, current or power delivered to said coil is varied independently of the other coil.

Reference will now be made, by way of example, to the accompanying drawings, of which:

Figure 5:
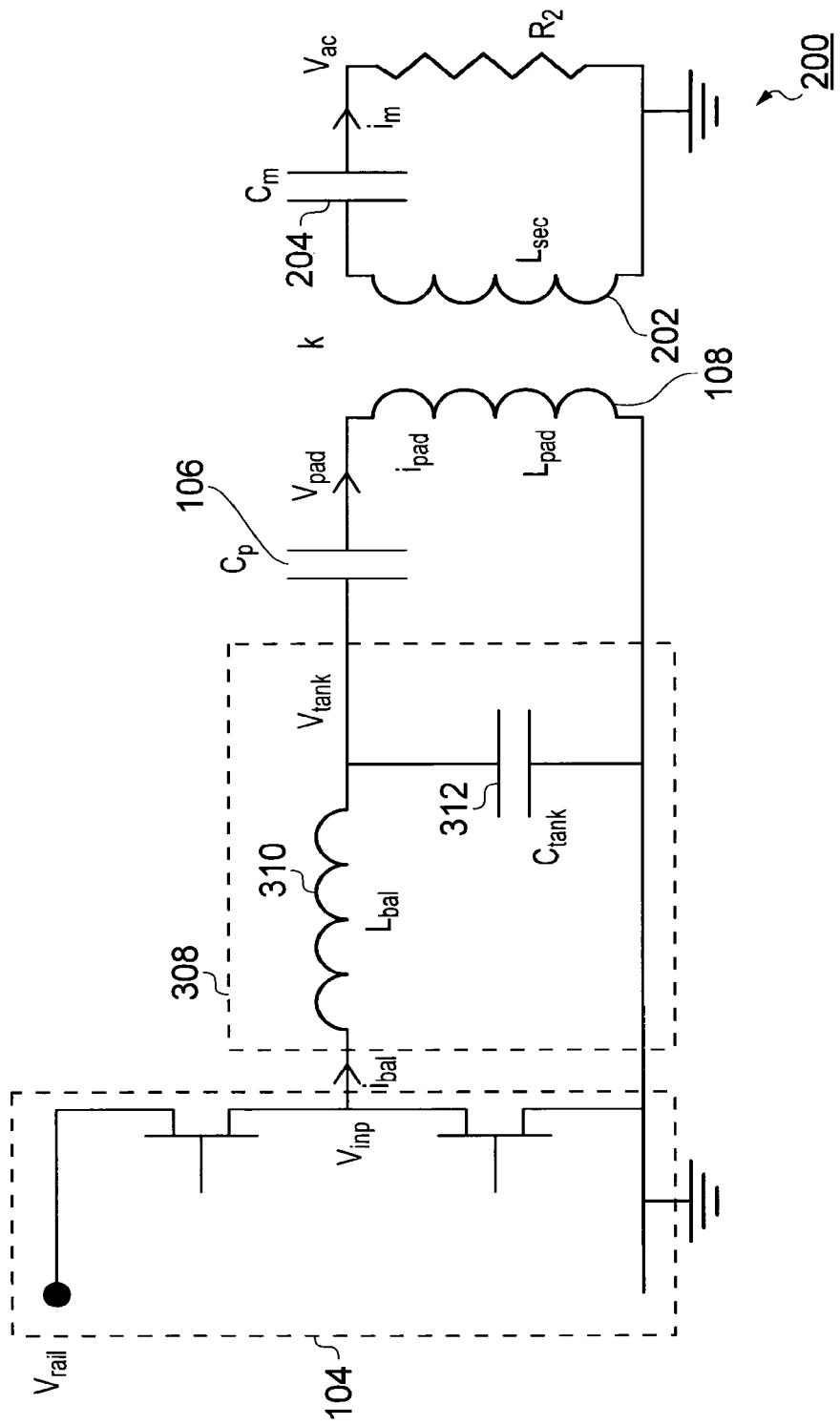
Figure 6:
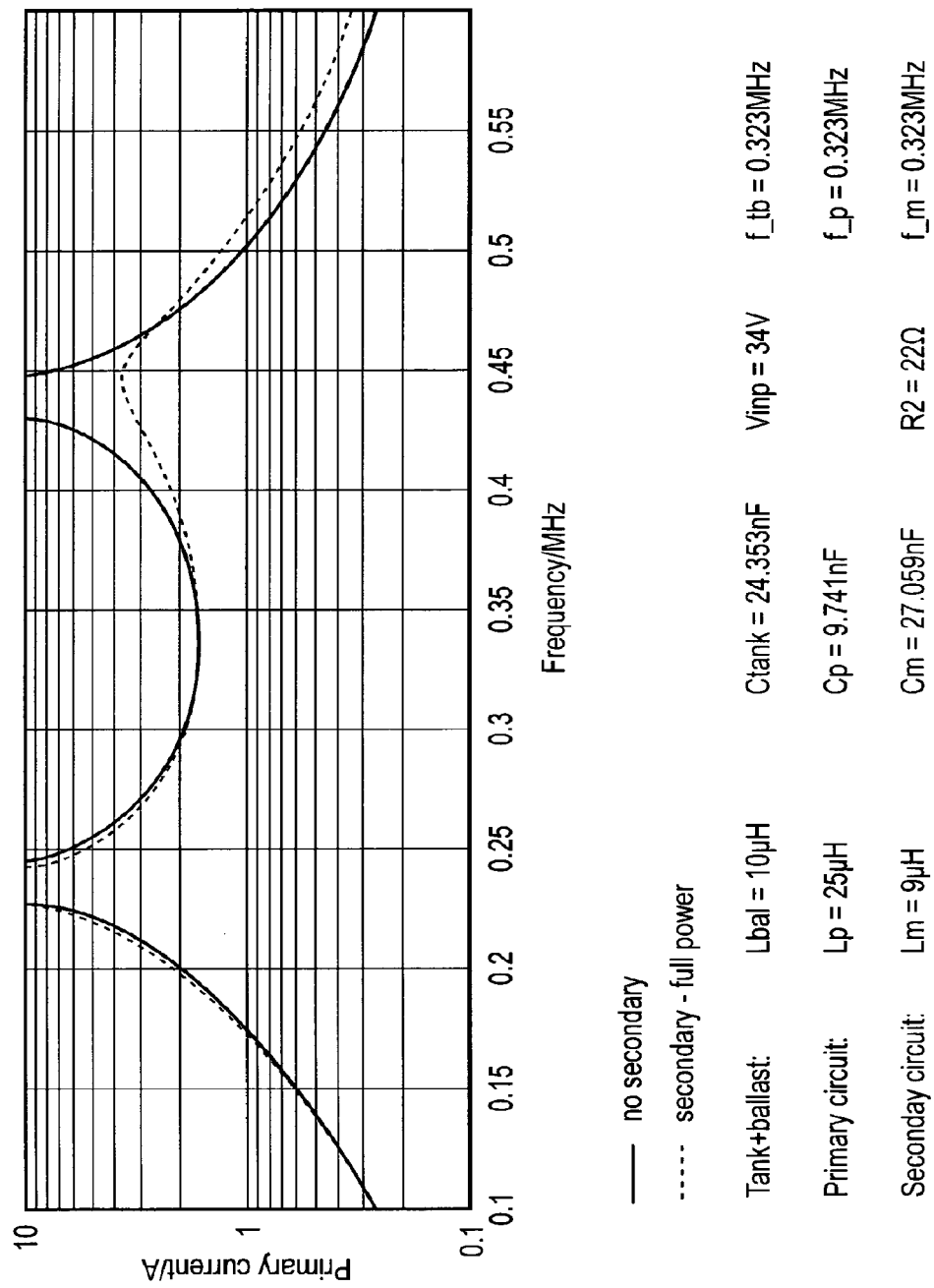
Figure 7:
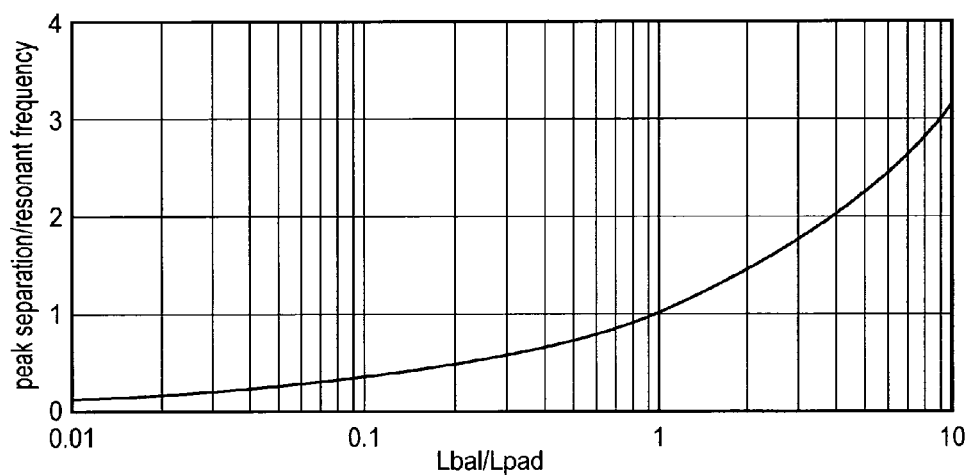
Figure 8:
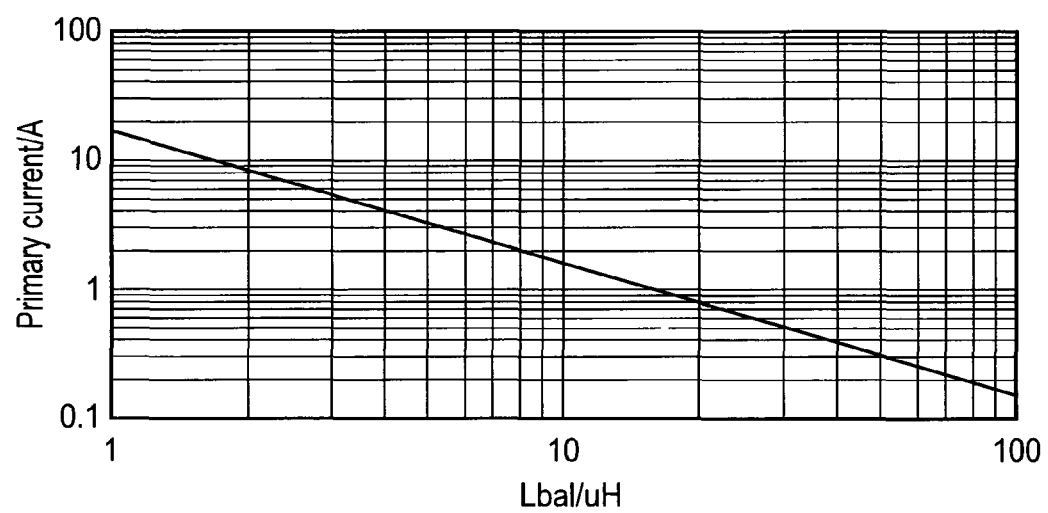
Figure 9:
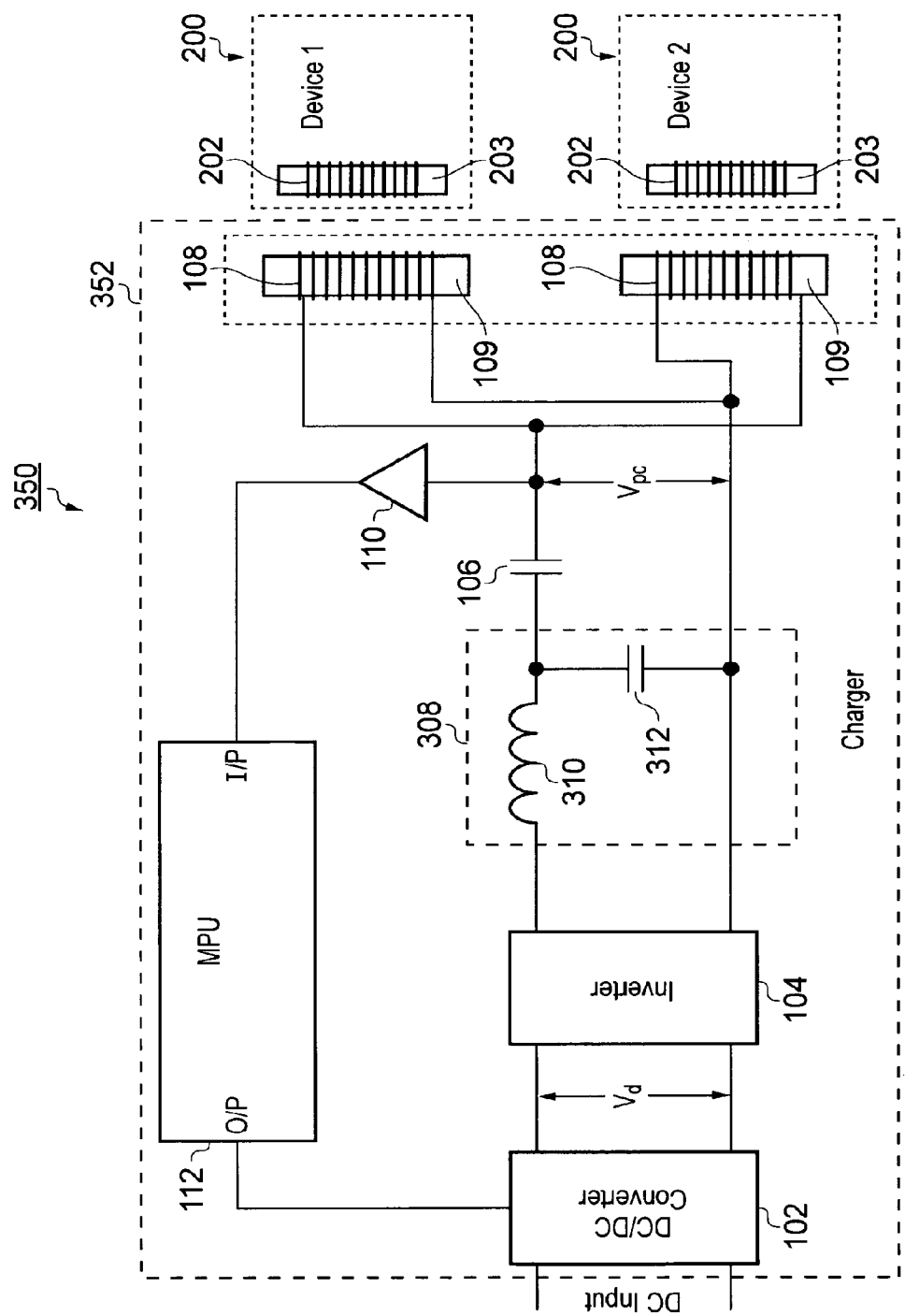
Figure 10:
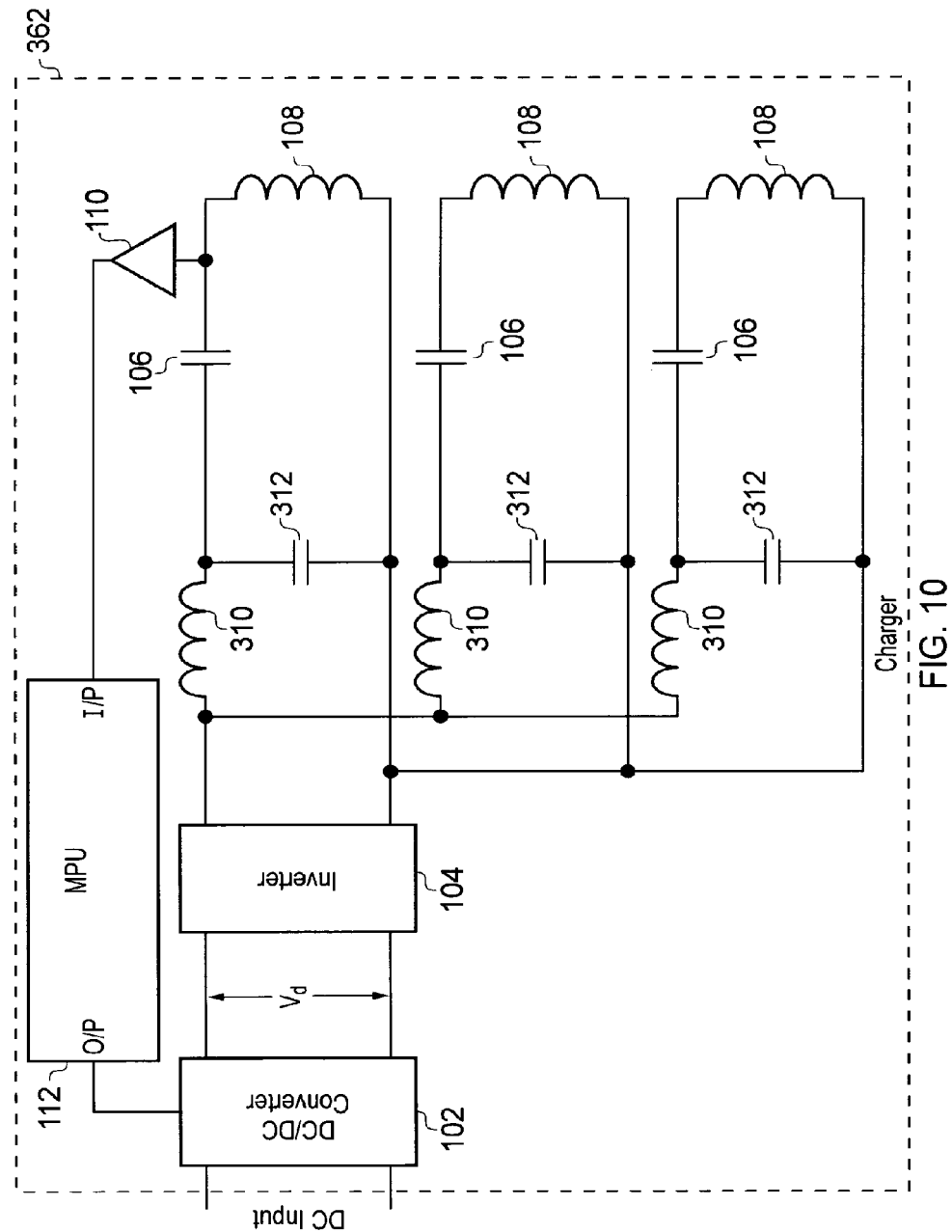
Figure 11:
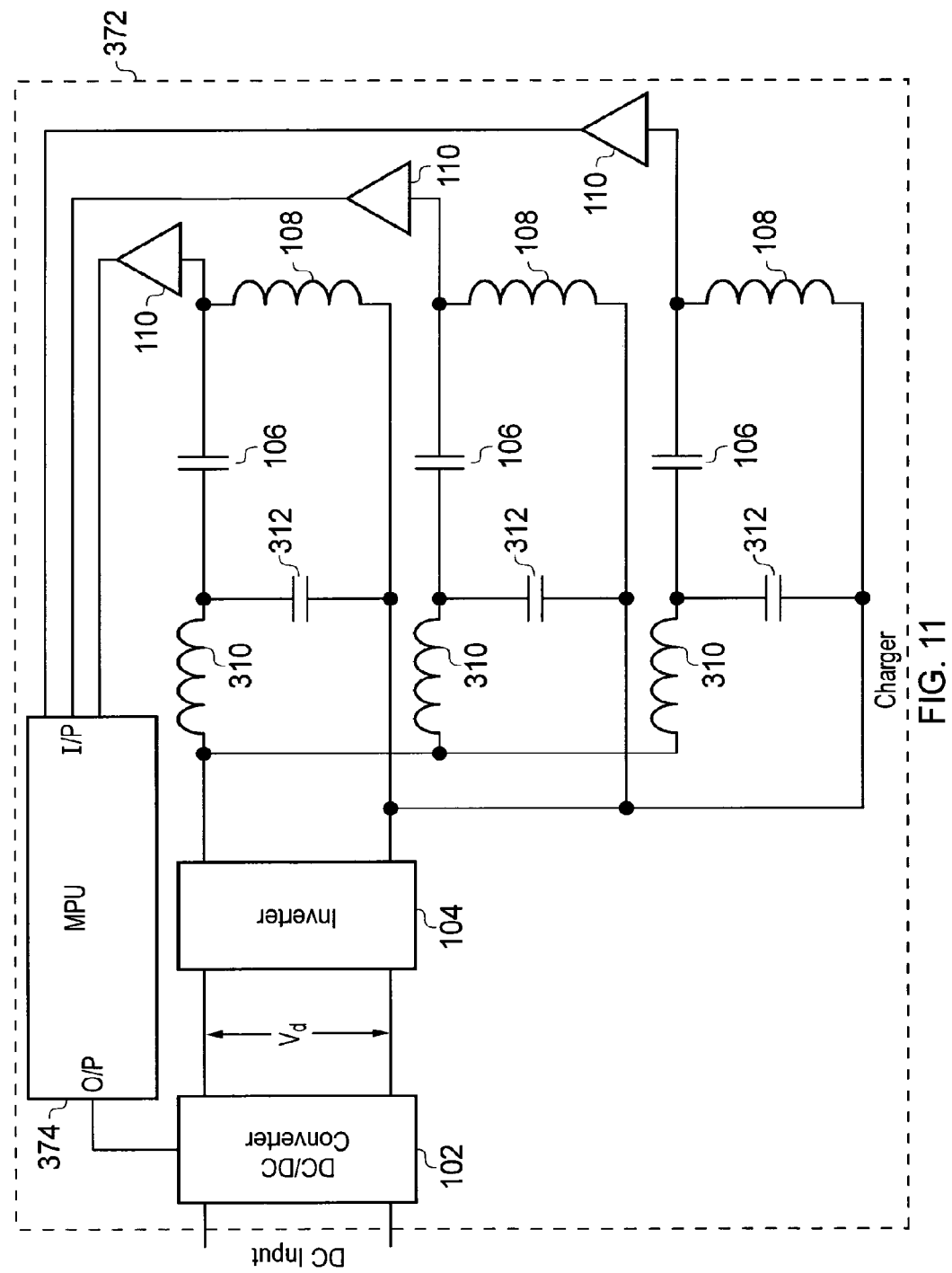
Figure 16:
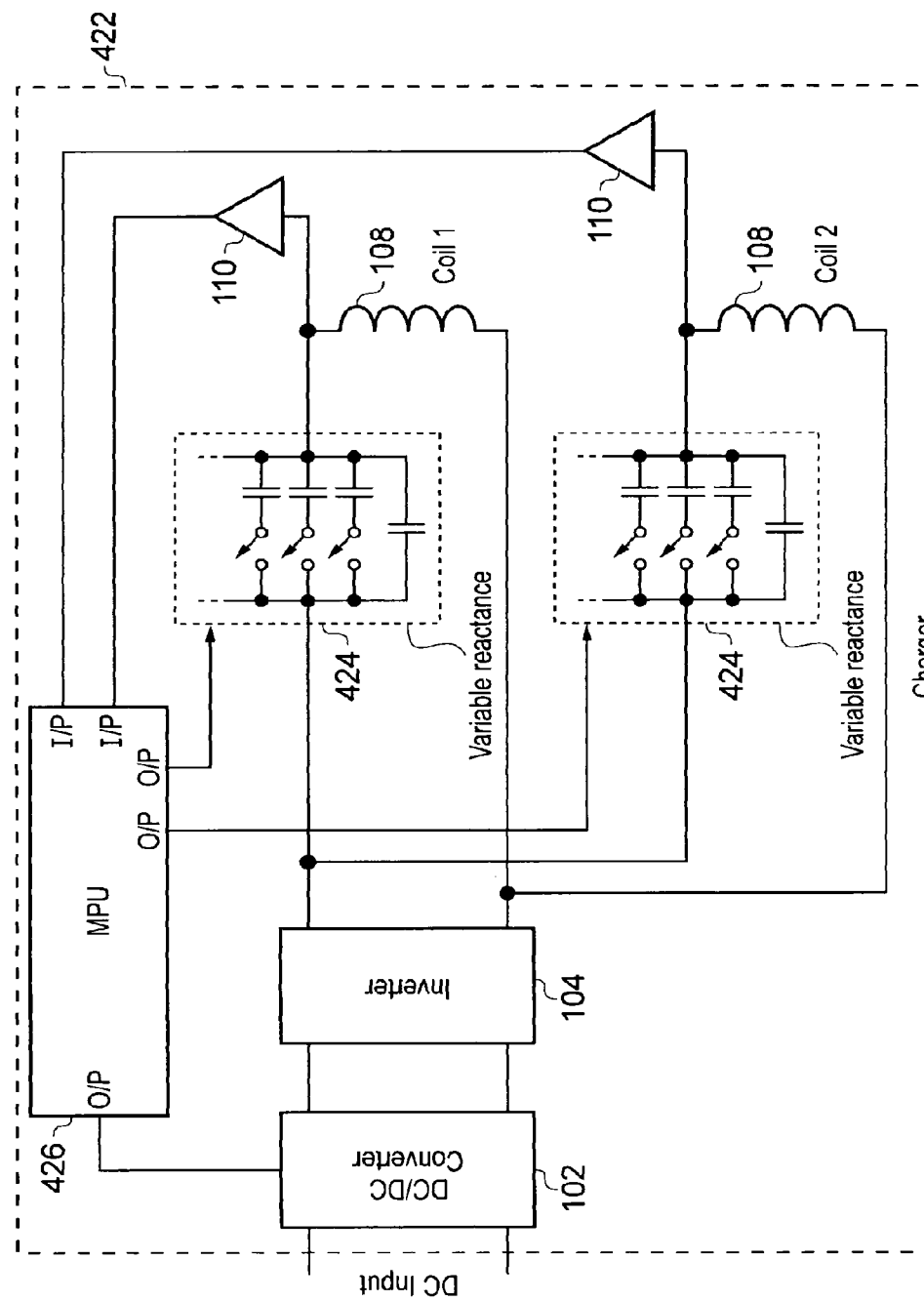
Figure 17:
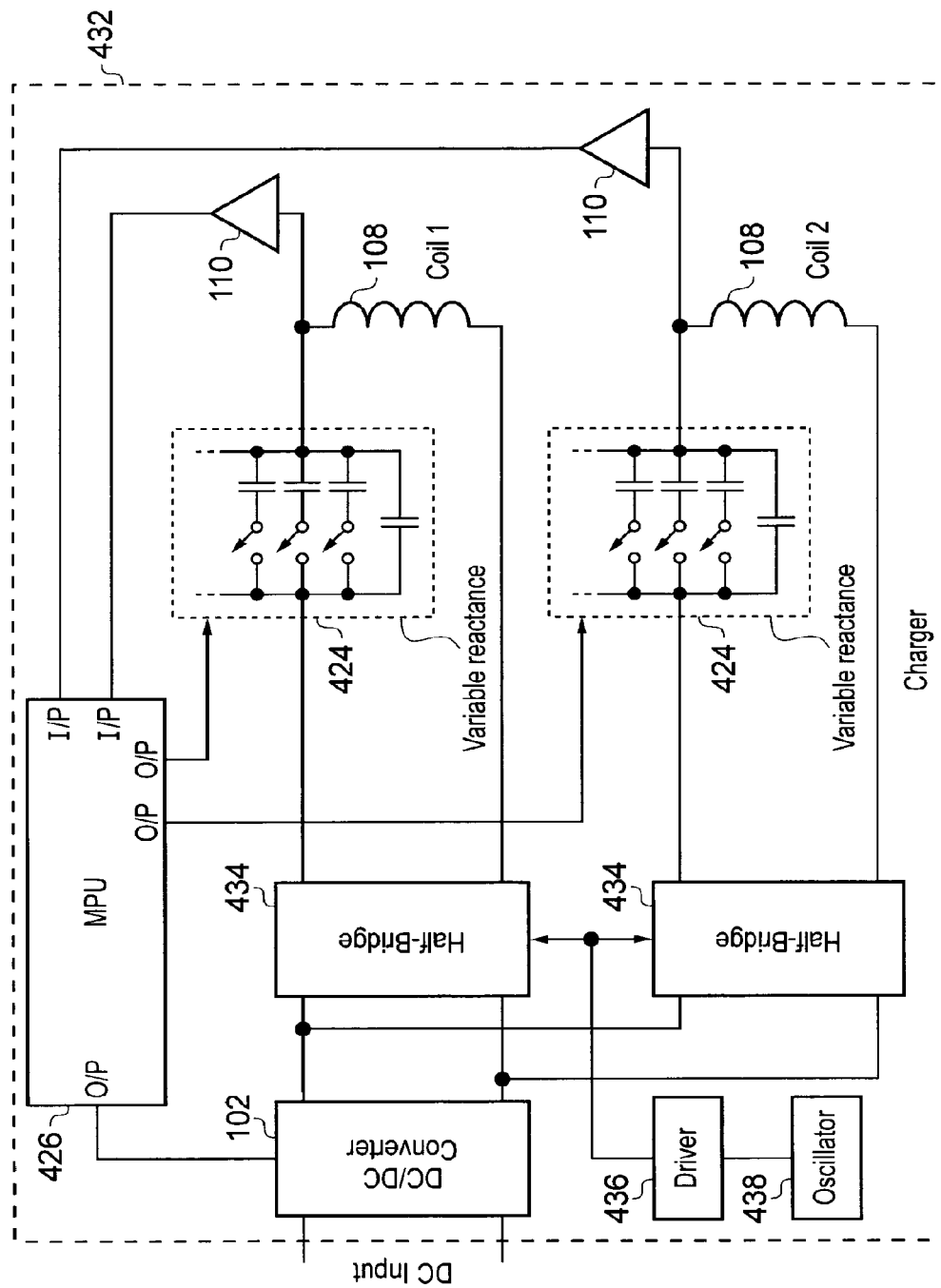
Figure 18:
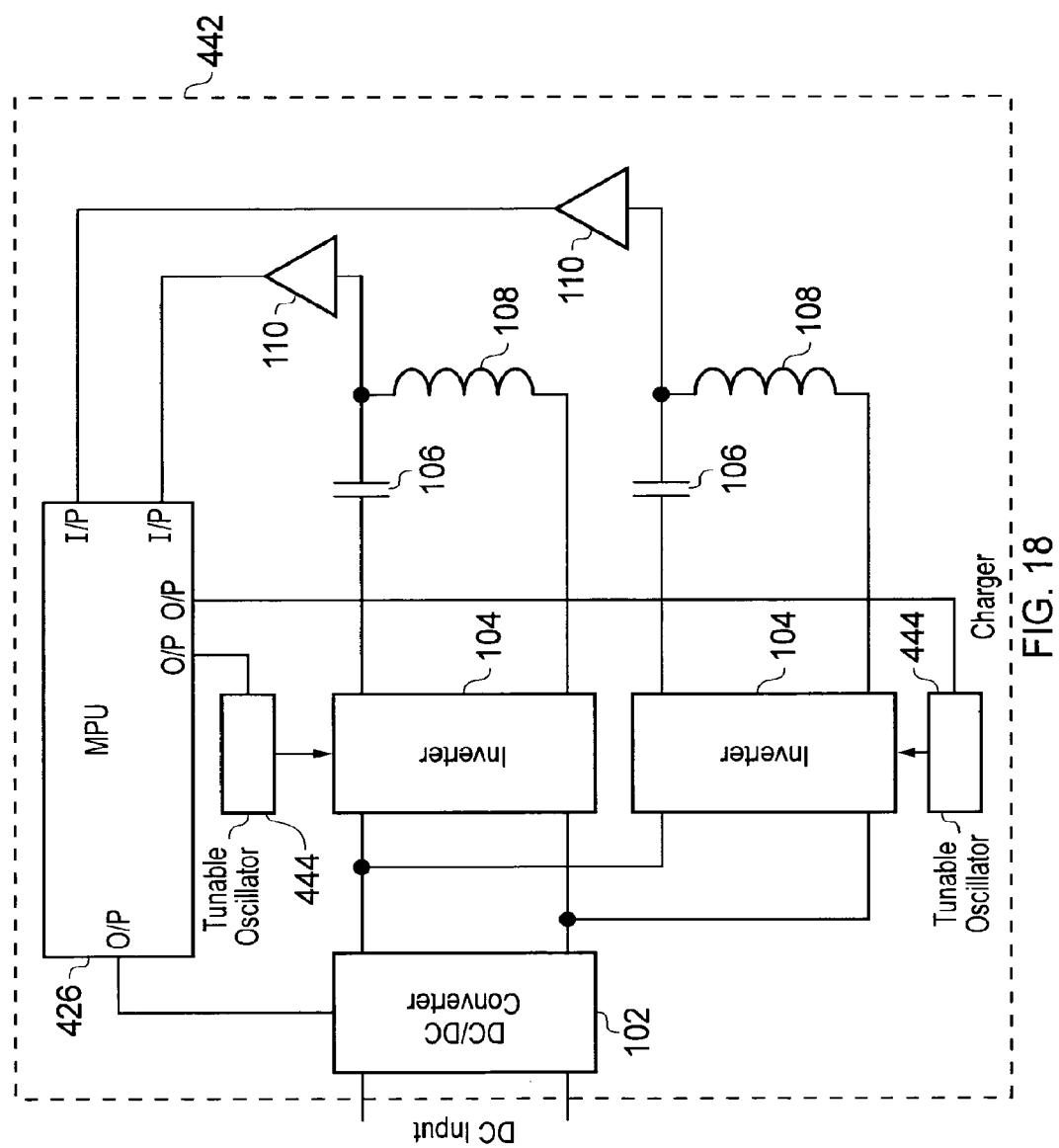
Figure 19:
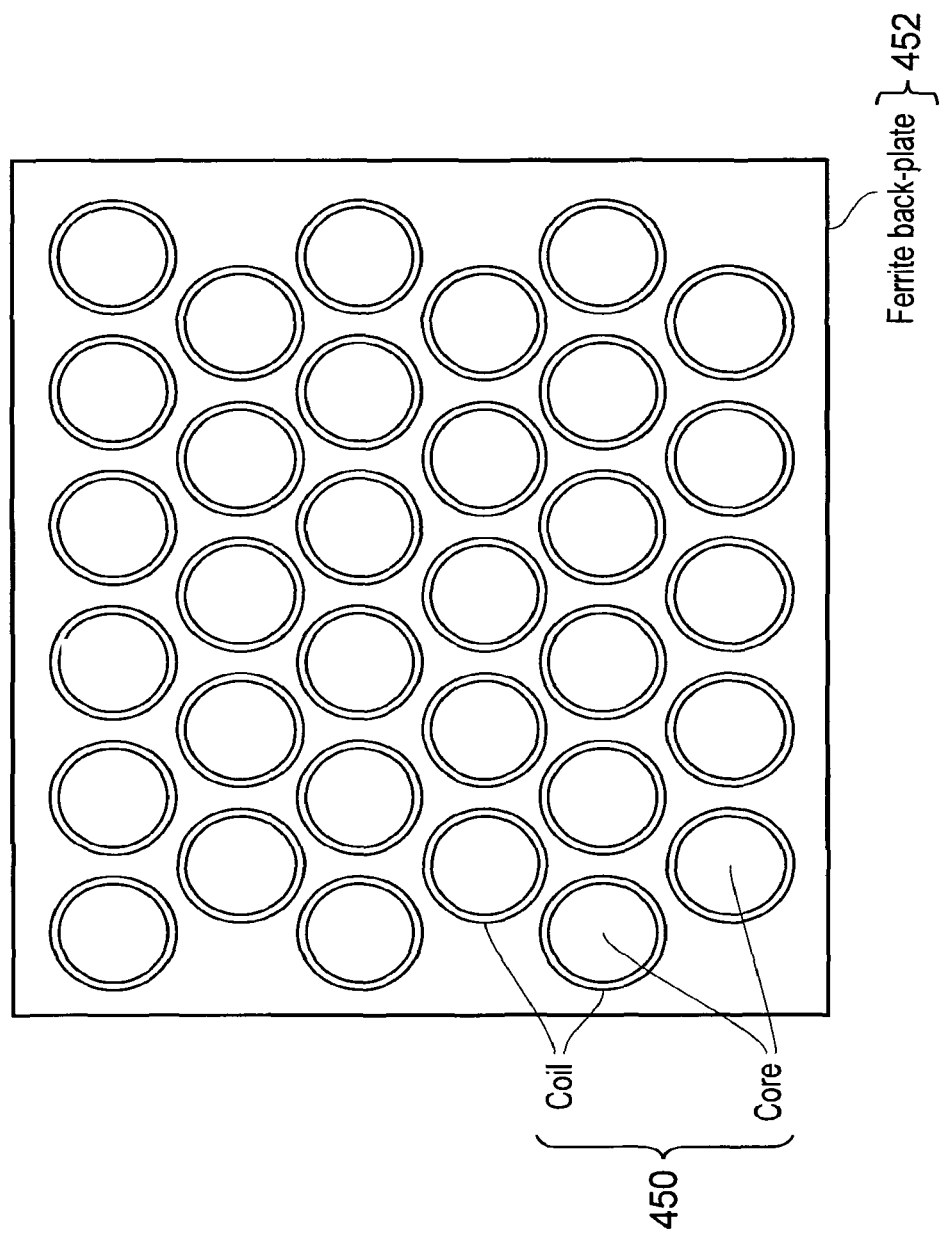
Figure 20:
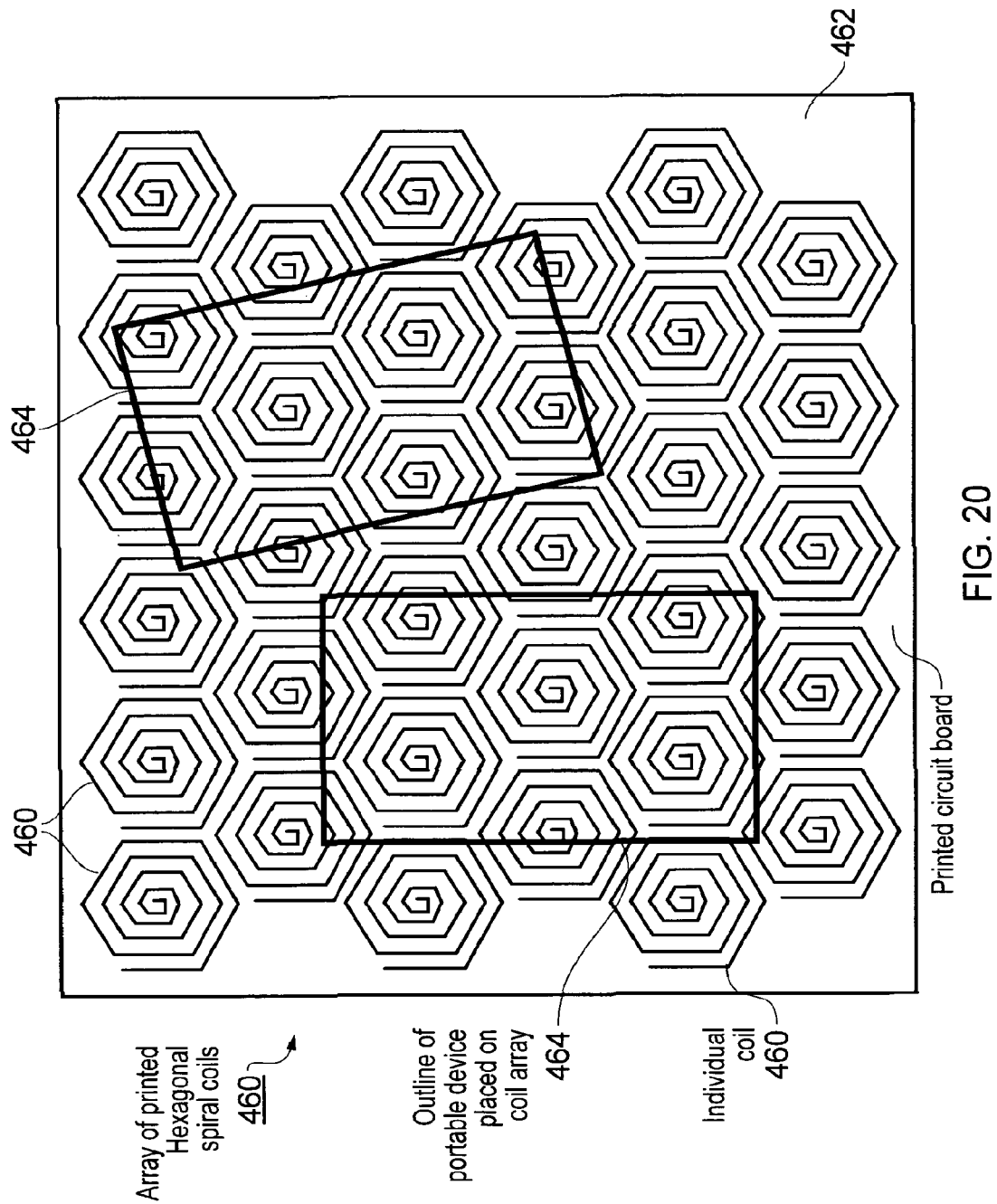
Figure 21:
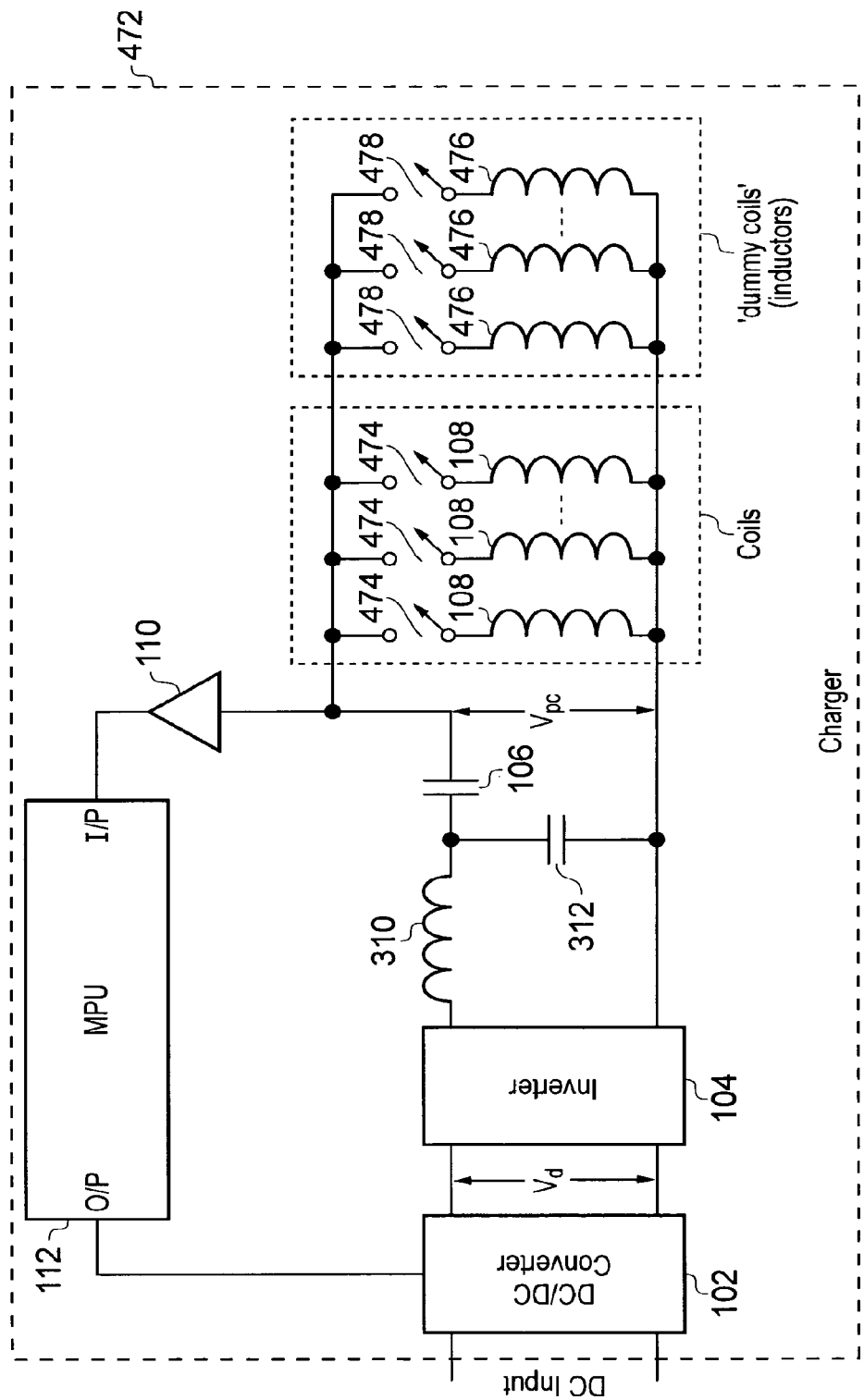
Figure 22:
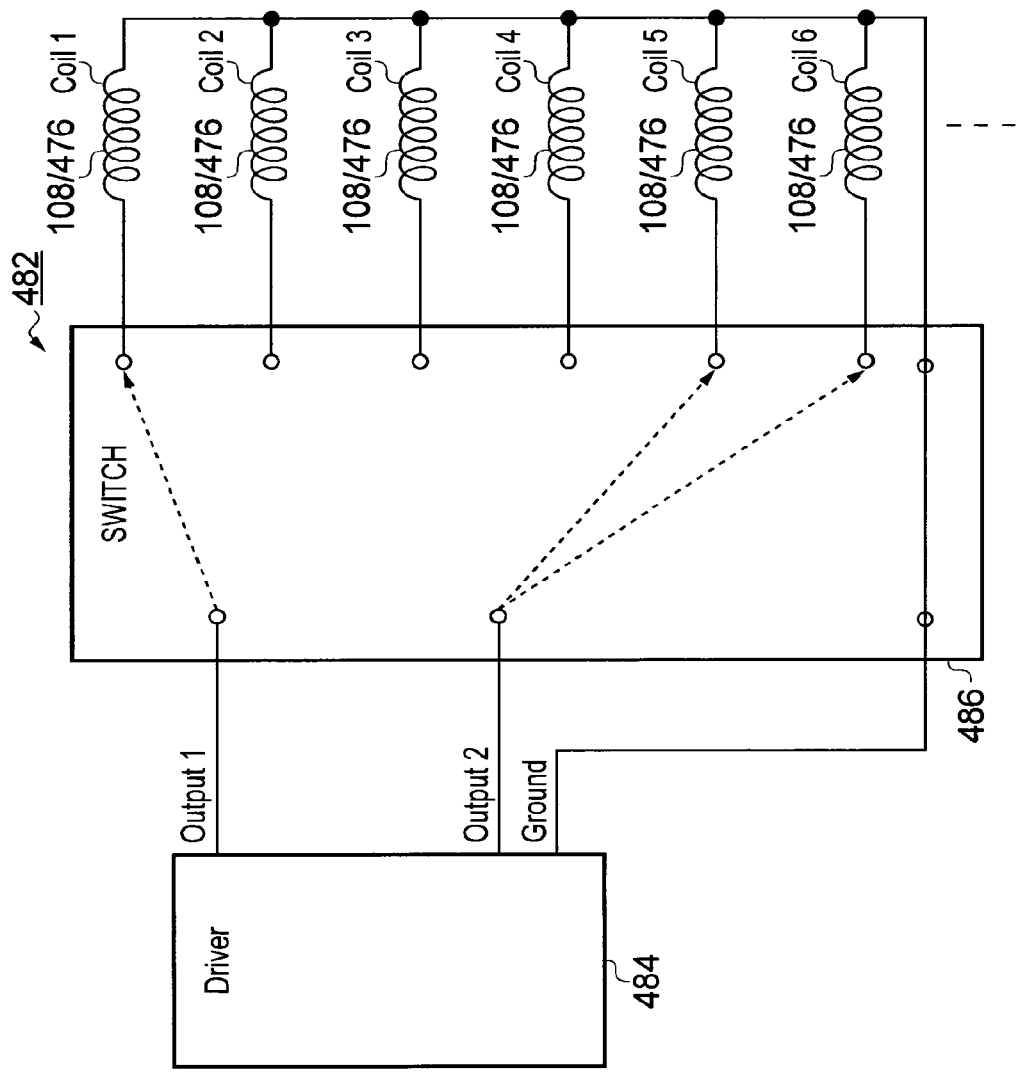
Figure 23:
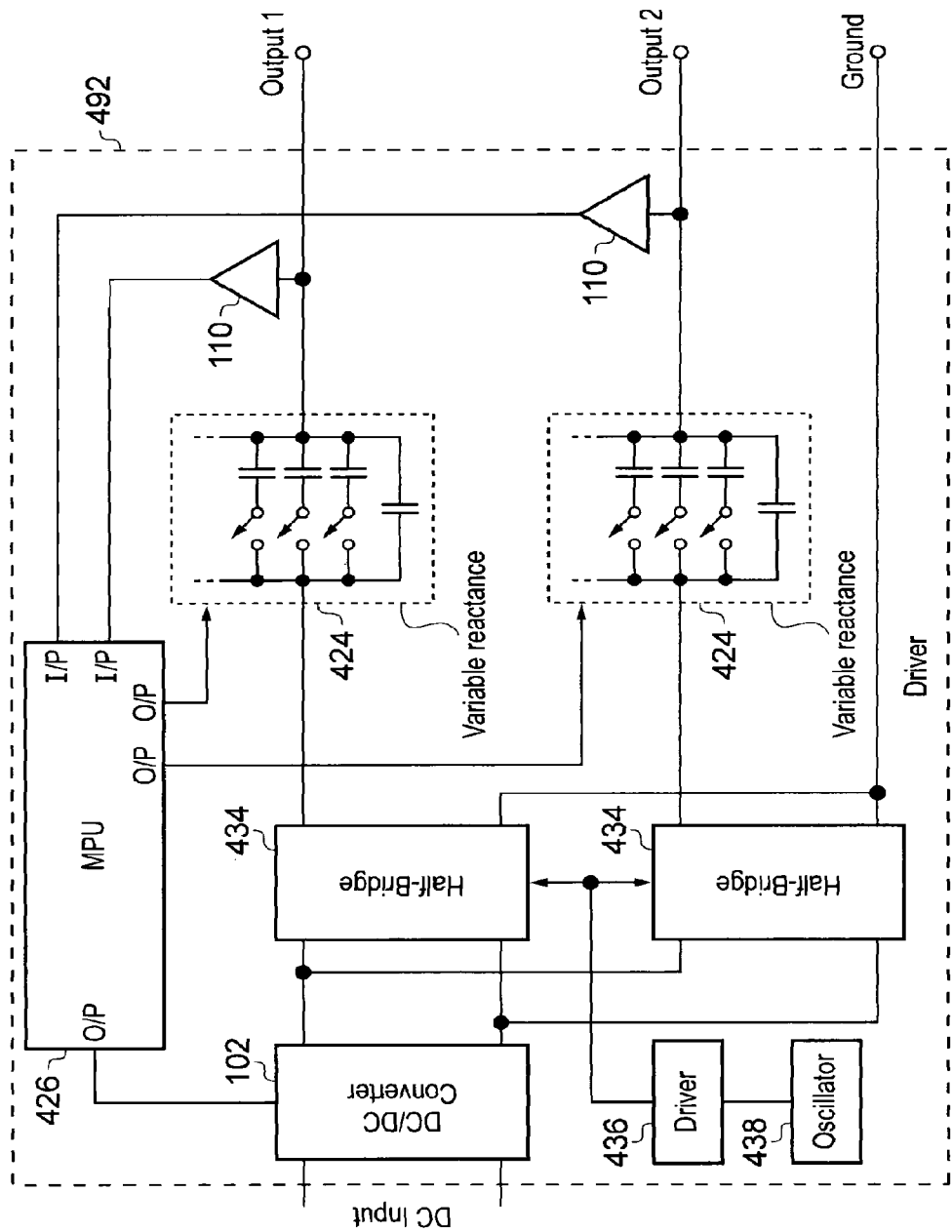
Figure 24:
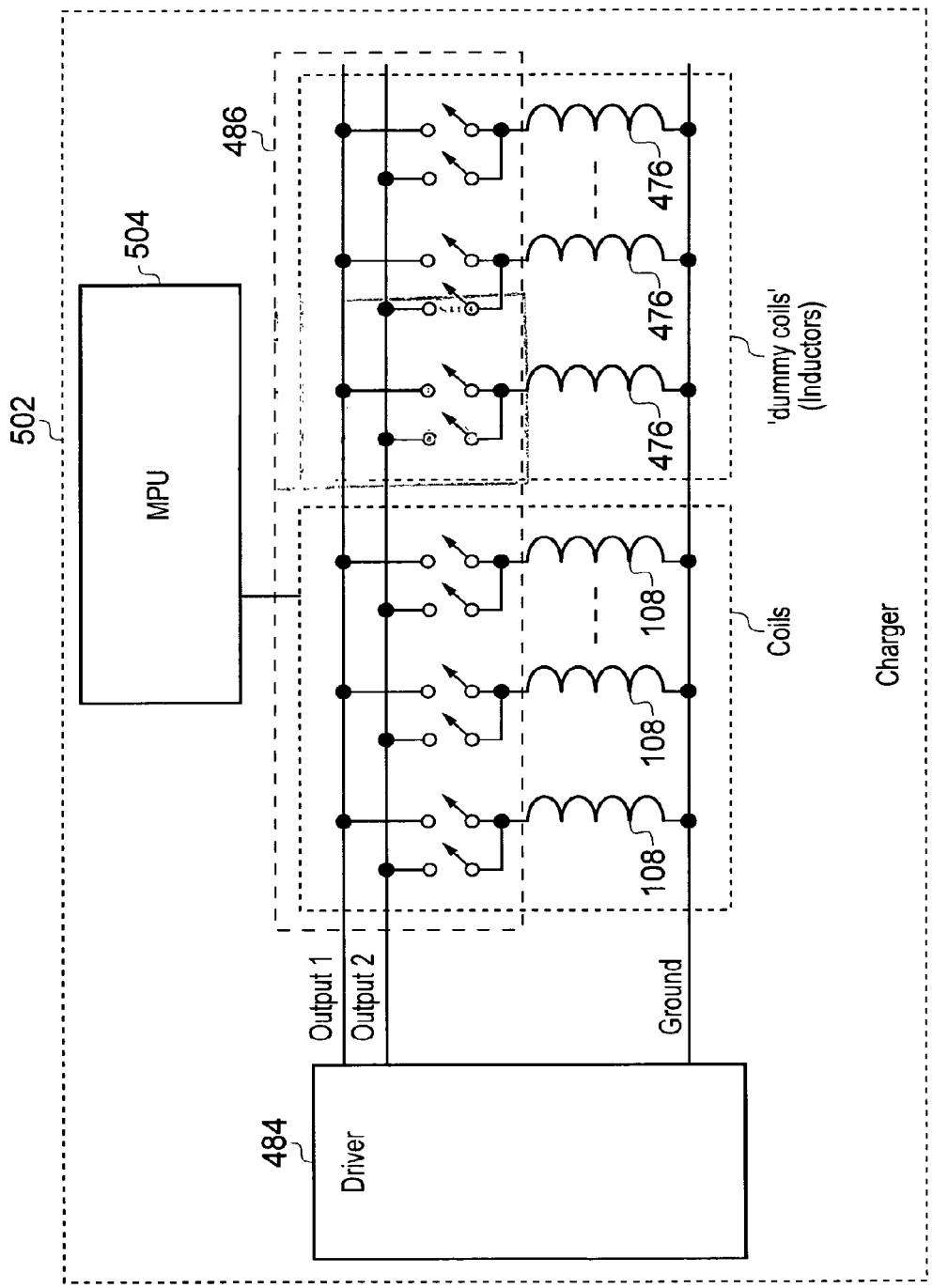

FIGS. 4A-D present a set of schematic diagrams useful for understanding the benefit of a ballast circuit in a primary unit according to one or more embodiments of the present invention;

FIG. 5 is a schematic diagram of a system according to one embodiment of the present invention, useful for performing simulations;

FIG. 6 is a graph of simulation results based on the FIG. 5 circuitry;

FIG. 7 is a graph of simulation results showing the effect of an inductor ratio on the separation between the resonant peaks;

FIG. 8 is a graph of simulation results showing the effect of the inductance value of a ballast inductor in the FIG. 5 circuitry on the current in the primary coil of the FIG. 5 circuitry;

FIG. 9 is a schematic diagram of a system according to one embodiment of the present invention;

FIG. 10 is a schematic diagram of a primary unit according to one embodiment of the present invention;

FIG. 11 is a schematic diagram of a primary unit according to one embodiment of the present invention;

FIGS. 12 to 15 are schematic diagrams of primary units respectively forming different embodiments of the present invention;

FIG. 16 is a schematic diagram of a primary unit according to one embodiment of the present invention;

FIG. 17 is a schematic diagram of a primary unit according to one embodiment of the present invention;

FIG. 18 is a schematic diagram of a primary unit according to one embodiment of the present invention;

FIGS. 19 and 20 are schematic diagrams of possible primary-coil layouts on charging surfaces of primary units according to some embodiments of the present invention;

FIG. 21 is a schematic diagram of a primary unit according to one embodiment of the present invention;

FIG. 22 is a schematic diagram of a primary unit representing a number of embodiments of the present invention;

FIG. 23 is a schematic diagram of a driver for use in one embodiment of the present invention; and FIG. 24 is a schematic diagram of a primary unit according to one embodiment of the present invention.

For a better understanding of embodiments of the present invention, reference will first be made to an example inductive power transfer system 1 not directly embodying the present invention, but useful for understanding embodiments thereof.

Figure 1:
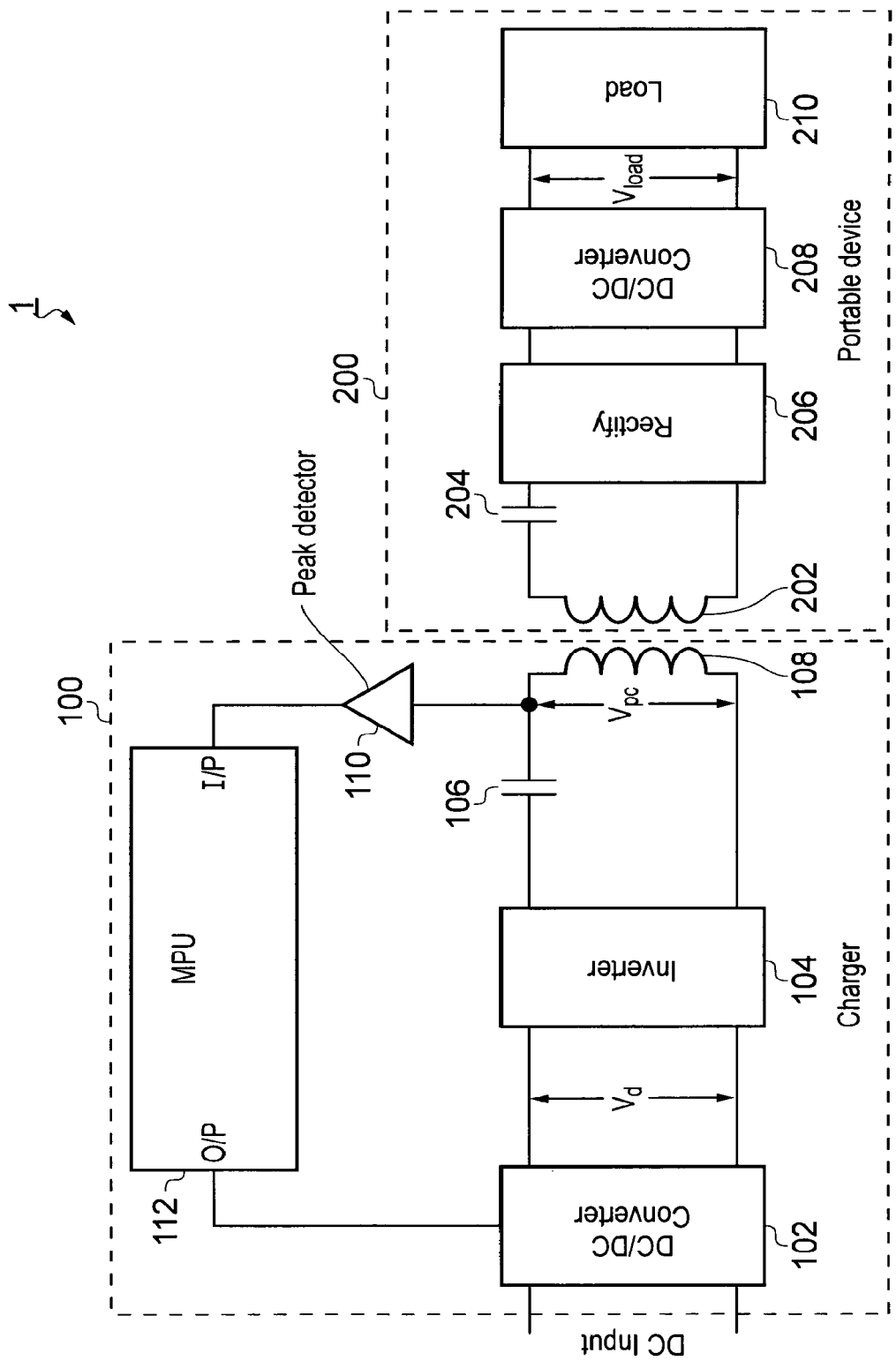
FIG. 1 is a schematic diagram of a previously-considered inductive power transfer system.

FIG. 1 is a schematic diagram of system 1. System 1 includes a primary unit (charger) 100 and a secondary unit (portable device, in this case) 200.

Primary unit 100 includes a DC/DC converter 102, an inverter 104, a capacitor (or capacitance) 106, a primary coil 108, a buffer 110, and a microprocessor unit (MPU) 112. Secondary unit 200 includes a secondary coil 202, a capacitor (or capacitance) 204, a rectifier 206, a DC/DC converter 208 and a load 210. Buffer 110 may be considered to be a peak detector, and may be employed to measure the peak voltage over the primary coil 108.

The primary unit 100 is configured to generate an electromagnetic field, and this field may be induced (as a horizontal or a vertical field, relative to a charging surface or power transfer surface of the primary unit) in proximity to the primary coil 108. It will be appreciated that the configuration of the field is dependent on the configuration (i.e. physical layout) of the primary coil 108. The electromagnetic field may be employed in the system 1 to transfer power to a secondary unit 200 requiring power located in proximity to the primary unit 100.

The primary unit 100 may have any suitable form, for example having a flat platform forming a power transfer surface on or in proximity to which the or each secondary unit 200 can be placed. In one case, the electromagnetic field may be distributed over a power transfer area of the surface, as described in GB-A-2388716, the entire contents of which are incorporated herein by reference. It will be appreciated that this form of primary unit may allow one or more secondary units 200 to be simultaneously located in proximity to the primary unit to receive power therefrom. It may be appreciated that many other forms of primary unit 100 may allow one or more secondary units 200 to be simultaneously located in proximity to the primary unit to receive power therefrom. Another possible form for primary unit 100 is a shelf, on which the secondary unit 200 can be placed to receive power. Such a form can be advantageous for allowing parts of the secondary device to sit outside the magnetic field.

The secondary unit 200 in FIG. 1 is separable from the primary unit 100 and includes the secondary coil 202 which couples with the electromagnetic field generated by the primary unit 100 when the secondary unit 200 is in proximity to the primary unit 100. In this way, power can be transferred inductively from the primary unit 100 to the secondary unit 200 without requiring direct electrically-conductive connections therebetween.

In order to transfer power inductively, the magnetic field/flux generated by the primary coil 108 should be time-varying. Accordingly, the primary unit 100 is configured to provide the primary coil 108 with time-varying electrical signals, such as alternating signals.

The primary coil 108 and the secondary coil 202 may have any suitable forms, but may for example be formed of copper wire wound around a high-permeability former, such as ferrite or amorphous metal. Litz wire is a particular type of wire which may be used in these circumstances. Litz wire has many strands of wire twisted together and can help reduce skin and proximity effects. The primary and secondary coils 108, 202 may be different from one another, for example in size, number of turns, type of core, and physical layout etc. Multiple primary and secondary coils may be employed, and the number of primary and secondary coils may be different from one another.

It will be appreciated from FIG. 1 that the secondary unit 200 is shown as a portable device, being an object requiring power. For simplicity, the portable device is shown as being the same as the secondary unit 200, however the secondary unit 200 may be a component (for example, removable) part of the portable device. Load 210 may therefore be considered to be the actual load of the secondary unit 200, although it could be separate or separable from the secondary unit 200. The primary unit 100 of system 1 is shown as being a charger, operable to charge the portable device 200 by electromagnetic induction. The primary unit may more broadly be considered to be a wireless power supply. That is, the charging of a battery (or other energy storage cell) is merely one example application of such primary units.

Accordingly, the secondary unit 200 may be considered to be only part of the device in FIG. 1, for example only the secondary coil 202, or the combination of the secondary coil 202, capacitor 204, rectifier 206 and DC/DC converter 208. The secondary unit 200 may thus be connected to an external load (load 210), and may be configured to supply inductively-received power to the external load. The secondary unit 200 may be carried in or by an object requiring power (secondary device), such as a portable electrical or electronic device or a rechargeable battery or cell. Further information regarding possible designs of secondary unit 200 and the objects (secondary devices) that can be powered by the secondary unit 200 can be found in GB-A-2388716 (referred to above). In GB-A-2388716, such secondary units may be referred to as secondary devices. The secondary unit 200 is merely shown as a portable device to improve an understanding of the present invention.

In the context of the present invention, secondary units (and/or secondary devices including such units) may be considered to be any electrical or electronic devices which require power, and may be portable such devices, for example (i.e. not exclusively) mobile phones, PDAs (Personal Digital Assistants), laptop computers, personal stereo equipment, MP3 players and the like, wireless headsets, vehicle charging units, home appliances such as kitchen appliances, personal cards such as credit cards, and wireless tags useful for tracking merchandise.

Within the primary unit 100 of the system 1, the DC/DC converter 102 is connected to receive an external DC input, and is operable to down-convert the received DC input to a lower DC voltage $V_d$. The DC/DC converter 102 may be a switch-mode Buck converter for high efficiency. The DC/DC converter 102 is connected to drive the inverter 104, which generates an AC voltage at its output. The inverter 104 may be a MOSFET half-bridge, driven from a reference oscillator (not shown).

The AC voltage output by the inverter 104 is used to drive the primary inductive coil 108. The capacitor 106 is connected in series with the primary coil, and the coil/capacitor combination is configured such that it is resonant at the operating frequency (the fundamental frequency) of the inverter 104. The primary unit 100 may in some cases not have series resonant capacitor 106. In order to reduce the harmonics present in the electrical drive signals driving the primary coil (i.e. the output of the inverter 104), it may be desirable to provide an LC ballast circuit (not shown) between the inverter 104 and the primary coil 108. The peak coil voltage in the primary coil 108, $V_{pc}$, is typically much larger than the DC voltage $V_d$ because the circuitry following the inverter (i.e. including primary coil 108 and capacitor 106) is configured to be resonant.

The operating frequency may be considered constant or could be variable (i.e. tunable) for efficiency reasons. Indeed, the frequency could be tuned as a way of regulating the coil voltage (i.e. the magnitude of the electrical drive signals in the coil). For example, if the primary coil 108 is configured to be resonant, then it is possible to vary the magnitude of the drive signals by varying the frequency.

In the secondary unit 200 (portable device) of system 1, the secondary coil 202 is connected to the input of the rectifier 206 in series with capacitor 204, again such that the coil/capacitor combination is resonant. The secondary unit 200 may in some cases not have series resonant capacitor 204. In use, the secondary coil 202 presents the rectifier 206 with an AC voltage received via electromagnetic induction from the primary coil 108. The rectifier 206 rectifies this AC voltage to output a DC voltage to the DC/DC converter 208. The DC/DC converter 208 down-converts the rectified voltage from the coil to match the input voltage required by the load 210.

DC/DC converter 208 is, in some situations, preferably a switch-mode converter (similarly to converter 102) rather than a linear converter. A switch-mode converter is typically able to convert from one DC voltage to another DC voltage far more efficiently than a linear converter. Furthermore, there is typically less variation in efficiency with input voltage for a switch-mode converter than for a linear converter. A linear converter generally drops any excess voltage across a resistance. Therefore, the larger the difference between the input and output voltages, the lower the efficiency. This variation in efficiency with input voltage can render the power drawn by the secondary unit 200 of the system 1 not independent of input voltage, which can be undesirable.

The DC/DC converter 208 of the secondary unit 200 is, optionally, configured to deliver a constant voltage to the load 210. This constant voltage may be maintained by means of a feedback loop (not shown). For example, the output voltage of the DC/DC converter 208 may be used to control the duty cycle of the DC/DC converter 208 in order to maintain the required input voltage, $V_{load}$, of the load 210 irrespective of changes to the input voltage of the DC/DC converter 208.

Over time, voltage requirements of the load for 210 may change, e.g. if the load 210 is a battery having a charging cycle. Such batteries may have constant-current and constant-voltage portions of such a charging cycle, and thus it will be appreciated that at different times focus may be placed on current rather than voltage. The DC/DC converter 208 may be configured to maintain the required load voltage $V_{load}$ at different levels for the different parts of such a charging cycle. However, the required load voltage $V_{load}$ typically changes on a relatively slow timescale (minutes), such that over a short period of time (seconds) it appears to be relatively constant. There may however be "transients" occurring on a fast timescale (milliseconds), generally infrequently. Movement of the secondary unit, or some particular capability of the secondary unit (e.g. if it has RF functionality, such as in a mobile telephone), may cause such transients.

The primary unit 100 of system 1 regulates the primary coil voltage $V_{pc}$ at a predetermined voltage level. This is achieved by means of a feedback loop including the buffer (peak detector) 110 and the microprocessor unit 112. As shown in FIG. 1, the primary coil voltage is essentially buffered by buffer 110 and input to the microprocessor unit (MPU) 112. Based upon the primary coil voltage, the microprocessor unit 112 may control the duty cycle of the DC/DC converter 102 in order to maintain the predetermined level of primary coil voltage $V_{pc}$ irrespective of the load presented by the secondary unit 200 (and/or any other such presented load).

The primary unit 100 of the system 1 may be configured to determine the amount of power drawn via the primary coil 108, or the amount of current passing through the primary coil 108, in addition to or instead of measuring the primary coil voltage $V_{pc}$. That is, the regulation could be based on voltage, current or power measurements. For example, if power is considered, the primary unit 100 could be considered to measure both the voltage $V_d$ and the current drawn from the DC/DC converter 102, $I_d$. Measuring the voltage and current at this point has the advantage that the signals are DC. Within the microprocessor unit 112, the signals concerned could be sampled using analogue-to-digital converters (ADCs) and low-pass filtered to reduce noise. Averaging may be used as part of this filtering. The values of the voltage $V_d$ and the current $I_d$ could then be, for example, determined within the microprocessor unit 112 and multiplied together to determine the power drawn.

The following description details a number of example embodiments of the present invention. It will be appreciated that other embodiments are possible within the scope of the appended claims. In embodiments detailed herein, like elements are denoted with like reference numerals, and duplicate description is therefore omitted. It will therefore be understood, for example, that features of system 1 and related description may apply to embodiments of the present invention by analogy.

Figure 2:
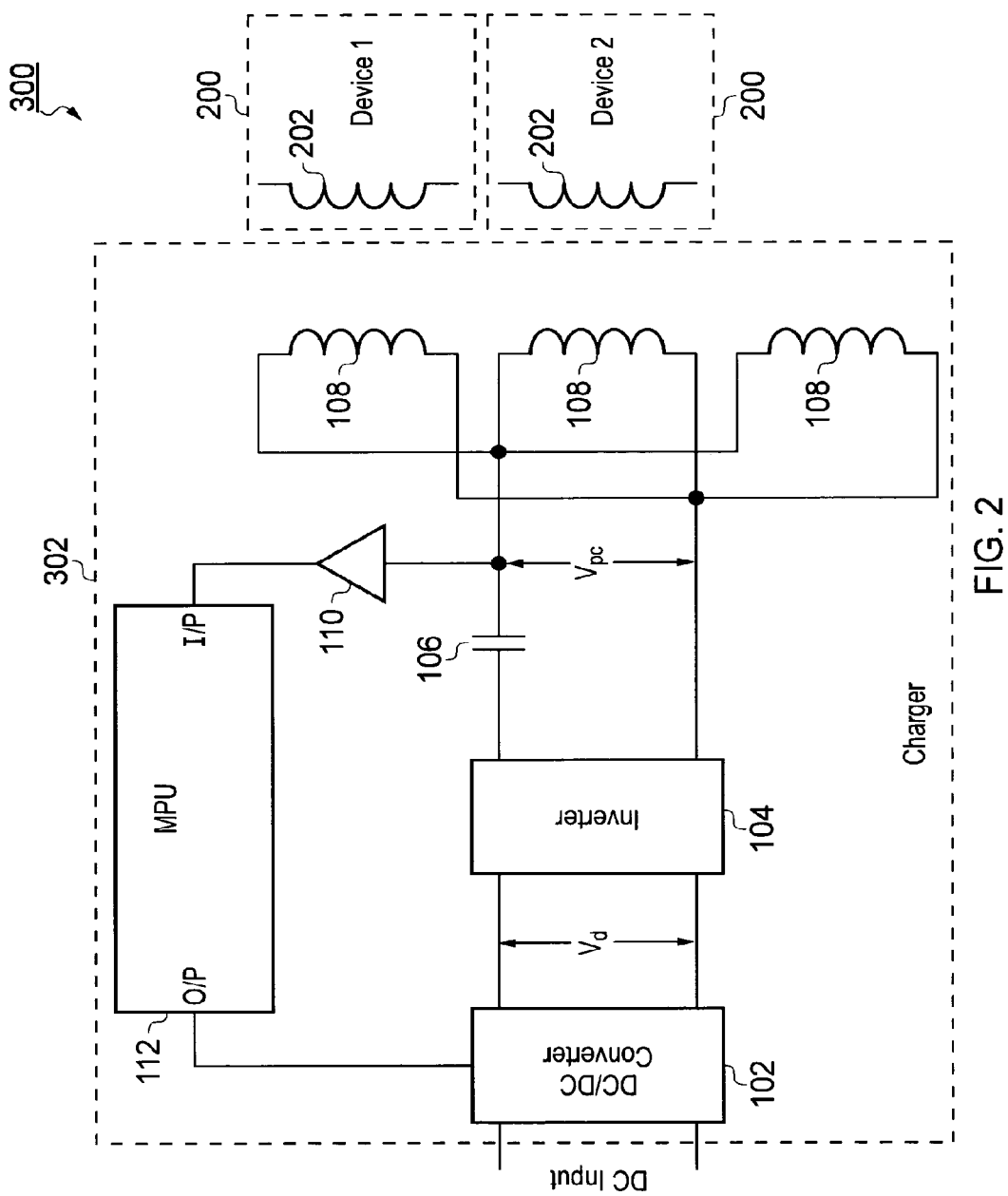
FIG. 2 is a schematic diagram of a system according to one embodiment of the present invention.

FIG. 2 is a schematic diagram of a system 300 according to one embodiment of the present invention. System 300 includes a primary unit 302 and a plurality of secondary units 200. System 300 may therefore be useful for supplying power inductively to two or more secondary units 200 simultaneously (or one after the other, for example without having to swap one device for the other).

It will be appreciated that FIG. 2 is presented at a circuitry level, and in this regard embodiments of the present invention focus on circuitry features. However, as well as relating to circuitry, the present invention extends to the primary unit itself (which may include features beyond the circuitry features shown, for example its physical structure) and to the overall power transfer system including such a primary unit.

In FIG. 2, the secondary units 200 are shown as each including a secondary coil 202 but as representative of corresponding circuitry devices. This demonstrates that secondary units 200 may be only components of such secondary devices, and also enables a simplification of the schematic diagram. Thus, in one embodiment of the present invention, secondary units 200 may be the same as that in FIG. 1. In another embodiment of the present invention, secondary units 200 in FIG. 2 (and in other Figures) may be different from that in FIG. 1, and may be different from one another.

Primary unit 302 differs from primary unit 100 in FIG. 1, in that it includes a plurality of primary coils 108. Primary coils 108 are connected together in parallel. Although three such primary coils are shown in FIG. 2, it will be appreciated that two or more such coils could be provided and that the number of coils could be large, for example up to 10 or up to 50, or more.

In the FIG. 2 embodiment, two of the primary coils 108 are shown as having a secondary unit 200 in proximity thereto, and the third primary coil 108 is shown as having no secondary unit 200 in proximity thereto. This is only by way of example, and it will be appreciated that any number of the primary coils 108 (or none of them) may have one or more secondary units 200 in proximity thereto, depending on the configuration of the primary coils 108 and the number of secondary units 200 requiring power. A primary coil (depending on its configuration) may simultaneously transfer power to more than one secondary unit. Similarly, a secondary unit may receive power simultaneously from more than one primary coil in the same primary unit.

The FIG. 2 embodiment is advantageous for the following reasons, at least. Compared to the example system in FIG. 1, the primary unit 302 is provided with the capability of transferring power via a plurality of primary coils 108 without requiring a large replication in circuitry. In particular, in primary unit 302 the extra capability (as compared to the FIG. 1 system) is provided by adding extra primary coils 108 in parallel. In this way, minimum additional cost and complexity is incurred.

In general, embodiments providing the extra capability with low replication in the circuitry may require higher-rated (higher-power capability) components than embodiments in which lower-rated parts are replicated. In general, it may be less cost intensive to employ higher-rated components than to increase component count.

Further, the voltage over each of the primary coils 108 can be regulated without needing to provide additional circuitry, because the primary coil voltage $V_{pc}$ is the same for all of the parallel-connected primary coils 108. Thus, it is the peak voltage across the parallel combination that is sensed and fed back via the microprocessor unit 112, and accordingly the control system is arranged such that it maintains all of the primary coils 108 at the same, regulated, voltage level. The FIG. 2 system is configured to operate when there are loads (secondary units/devices) in proximity to all of the primary coils 108 or only in proximity to some of the primary coils 108. The FIG. 2 system is able to operate when there are different loads on different primary coils 108. The regulation based on sensing the primary coil voltage $V_{pc}$ at a single point is satisfactory since the primary coils 108 are mutually parallel. The series capacitor 106 is provided in common to all of the primary coils 108. Thus, the primary coils 108 are configured to be resonant at an intended frequency (i.e. tuned). The intended frequency may be the frequency at which the inverter 104 generates its alternating current (i.e. at the fundamental frequency of the alternating current).

Figure 3:
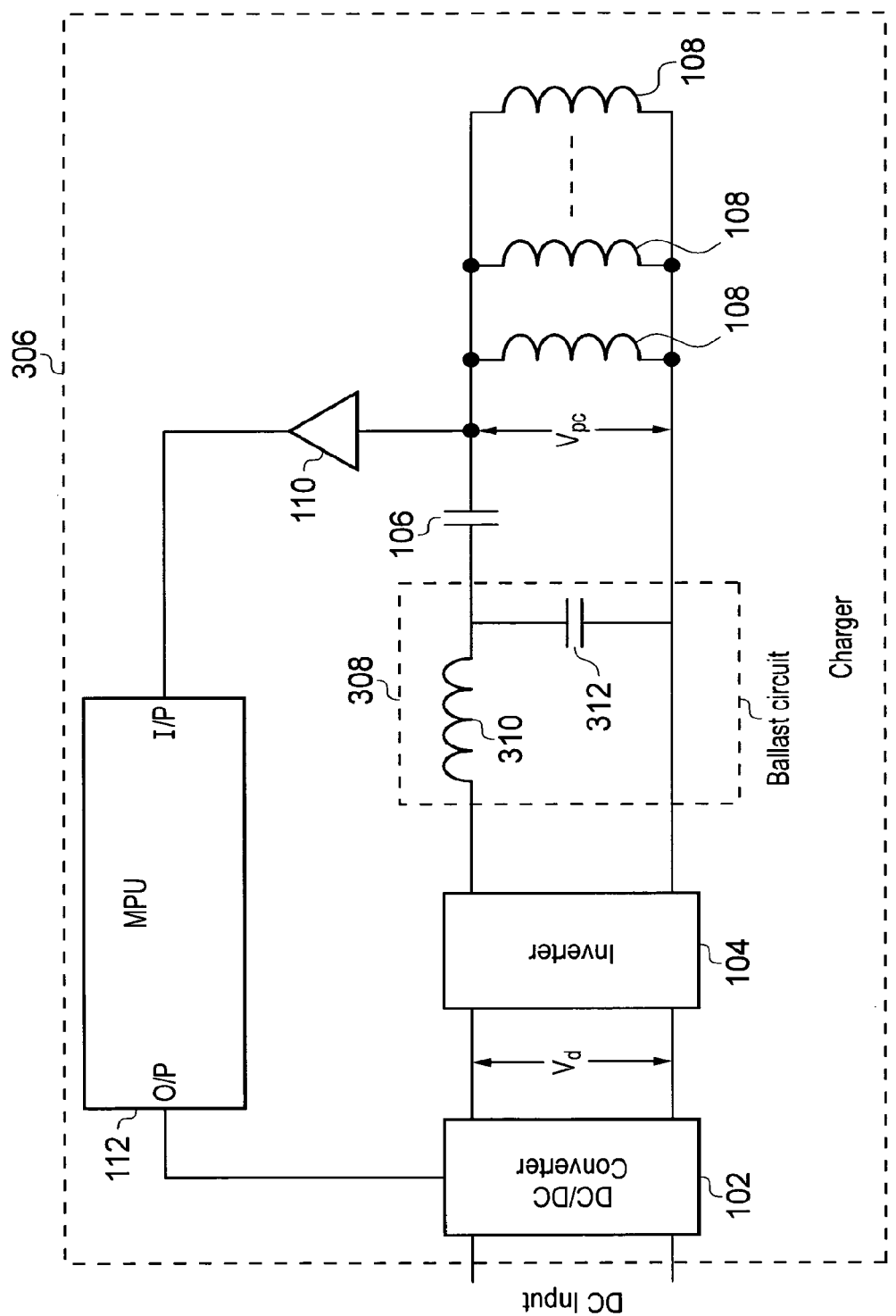
FIG. 3 is a schematic diagram of a primary unit according to one embodiment of the present invention.

FIG. 3 is a schematic diagram of a primary unit 306 according to one embodiment of the present invention. Primary unit 306 may, for example, be used interchangeably with primary unit 302 in the FIG. 2 embodiment.

Primary unit 306 differs from primary unit 302, in that a ballast circuit 308 is provided. In addition, it is more clearly apparent from FIG. 3 that any number of primary coils 108 may be provided in parallel with one another.

Ballast circuit 308 is provided between the inverter 104, and the capacitor 106 and coil 108 combination. Ballast circuit 308 includes an inductor 310 and capacitor 312. Accordingly, ballast circuit 308 may be referred to as an LC ballast circuit. Inductor 308 is connected in series between the inverter 104 and the capacitor 106. Capacitor 312 is connected in parallel with the capacitor 106 and coil 108 combination.

In the present embodiment, the ballast circuit 308 is advantageous as it acts as a low-pass filter and reduces the magnitude of harmonics present in signals on the primary coils 108. This may help to reduce or avoid the generation by the primary unit 306 of unwanted radio-frequency interference and electromagnetic interference.

The presence of the ballast circuit 308 in the primary unit 306 can also be advantageous from the point of view of stability of operation of the primary unit and in terms of regulating operation of the primary unit. This can be true both when the primary unit has a single primary coil 108 and when the primary unit has a plurality of primary coils. Such a ballast circuit may be configured advantageously to improve system stability by appropriate selection of component values. Advantages relating to the ballast circuit 308 will now be considered further.

FIGS. 4A-3 present a set of schematic diagrams useful for understanding the benefit of a ballast circuit in a primary unit of an inductive power transfer system.

FIG. 4A is a schematic diagram representative of parts of the system of FIG. 2. It is assumed that the primary side is supplied with a fixed alternating current such that the primary coil 108 generates an electromagnetic field to transfer power inductively to the secondary side. It is also assumed that characteristics of the secondary side are unknown, for example the load in the secondary unit, the number of secondary units present, etc. It is also assumed that no regulation of the signals in the primary coil 108 is provided. Importantly, no ballast circuit is present in the FIG. 4A circuitry.

FIG. 4B is a schematic representation of the frequency response of the circuitry in the primary side of FIG. 4A. The solid curve indicates that the FIG. 4A circuitry may have a resonant response with a single main peak. The curves shown with dashed lines are to represent ways in which the resonant response could change with the changing secondary side (e.g. changing load, number of secondary units, etc). As shown, the slope of the curve could change either side of the resonant peak or the peak frequency could change, or indeed a combination of those changes could occur.

It will be appreciated that if the signals in the primary side are at a particular frequency (e.g. as indicated by the vertical dashed line in FIG. 4B), then the changing frequency response adds a significant burden in the primary side if it is desired to regulate, for example, the voltage over the primary coil. This problem is present with a single primary coil 108 as in FIG. 4A, and is exacerbated with multiple mutually-parallel primary coils 108 as in FIG. 2.

FIG. 4C is a schematic diagram representative of parts of the system of FIG. 3. Again, it is assumed that the primary side is supplied with a fixed alternating current such that the primary coil 108 generates an electromagnetic field to transfer power inductively to the secondary side. It is also assumed that characteristics of the secondary side are unknown, for example the load in the secondary unit, the number of secondary units present, etc. It is also assumed that no regulation of the signals in the primary coil 108 is provided. However, in this case, ballast circuit 308 is present in the circuitry.

FIG. 4D is a schematic representation of the frequency response of the circuitry in the primary side of FIG. 4C. The solid curve indicates that the FIG. 4C circuitry may be configured to have a resonant response with two main peaks, joined by a relatively flat portion. The curve shown with a dashed line is to represent a way in which the resonant response could change with the changing secondary side (e.g. changing load, number of secondary units, etc). As shown, although the form of the peaks may vary, and although the slopes on either side of the peaks may vary, the substantially flat central portion (marked with the box labelled "X" in FIG. 4D) experiences little, if any, change.

Thus, if the signals in the primary side are at a particular fundamental frequency chosen to be comfortably within box X, i.e. in the relatively stable central portion, then the changing frequency response with changing secondary side adds little or no substantial burden in the primary side if it is desired to regulate, for example, the voltage over the primary coil. Effectively, the primary side is desensitized to changes on the secondary side. This benefit, over the FIG. 4A circuitry, is provided on a single primary coil 108 as present, and possibly more so if a plurality of primary coils are present. Thus, the FIG. 3 circuitry is considered to embody the present invention even when only one primary coil 108 is provided.

FIG. 5 is a schematic diagram akin to that in FIG. 4C, i.e. of a system according to one embodiment of the present invention in which the primary side has a ballast circuit. The schematic diagram has been used to simulate operation of the system, to demonstrate the benefits of the ballast circuitry.

To ease understanding of the circuitry in FIG. 5, the relevant elements have been denoted with the same reference numerals as corresponding elements in FIGS. 1 to 4. Briefly, the primary-side circuitry is driven by inverter 104, and includes inductor 310 (ballast, $L_{bal}$) and capacitor 312 (tank, $C_{tank}$) whose values are chosen such that it is tuned to frequency $f_0=1/(2\pi\sqrt{LC})$. The circuitry further includes the primary coil 108 (pad inductor, $L_{pad}$ or $L_p$) and capacitor 106 (series resonant cap, $C_p$), which are also tuned to $f_0$. Frequency $f_0$ is chosen as the switching frequency of the inverter 104 for the present simulations, which frequency is typically in the range 100-500 kHz for wireless power transfer applications. For consistency with the FIG. 3 embodiment, primary core 108 (pad inductor, $L_{pad}$) may be a single primary coil 108 or a plurality of mutually-parallel (or even series-connected) coils. The additional labels in FIG. 5 are designators for the simulations.

For the simulation, the inductor 310 (ballast) and capacitor 312 (tank) are driven by a constant AC voltage (provided from inverter 104) and can effectively act as a constant current source or be used to provide a constant coil voltage. This is effectively independent of small component tolerances, since (as mentioned above) operation is carried out in the flat region of the frequency-response curve, between the two main resonant peaks.

FIG. 6 is a graph of simulation results based on the FIG. 5 circuitry. In particular, FIG. 6 is a frequency response curve obtained using the parameter values set out below it. The labelling of the parameters corresponds to the labelling in FIG. 5. The frequency of operation was chosen to be 323 kHz (0.323 MHz).

As can be seen, from the solid-line curve in FIG. 6, the frequency response was found to be much as shown in FIG. 4D, i.e. with two main resonant peaks with a substantially flat portion therebetween. The frequency of operation, 323 kHz, was chosen to be in the centre of the curve between the two main peaks, where the curve is substantially flat. The solid-line curve shows the response when no secondary unit is present, and the dashed-line curve shows the response when the secondary-side is present and operating at full power. As can be seen, the operating point in the curve (in the flat portion) does not noticeably change between these two situations.

In one embodiment of the present invention, it is advantageous to keep each pair of components, i.e. the inductor 310 and capacitor 312 as one pair and the capacitor 106 and primary coil 108 as another pair, tuned to the same frequency $f_0$ (by suitable selection of their inductance and capacitance values), as this maintains the same basic resonant curve shapes. Within this constraint, increasing the ratio ("the inductor ratio") of the inductance of the ballast inductor 308 to the inductance of the primary core 108 (i.e. $L_{bal}/L_{pad}$) moves the resonant peaks further apart in frequency, and lowering the inductance of the ballast inductor 308 increases the current in the primary coil (the pad current). The following equations are useful in understanding these relationships.

The resonant peaks are located as follows:

$$\frac{\omega_{peak}}{\omega_0} = \sqrt{\frac{\beta + \sqrt{\beta^2 - 4}}{2}}, \sqrt{\frac{\beta - \sqrt{\beta^2 - 4}}{2}} \quad \beta = \frac{Lbal}{Lpad} + 2$$

where $\omega_{peak}$ is the peak angular frequency (in radians), $\omega_0$ is the operating angular frequency (in radians), i.e. the centre-frequency of the response curve, $L_{bal}$ is the inductance of ballast inductor 310 and $L_{pad}$ is the inductance of the primary coil 108.

The current in the primary coil 108 is approximately given by:

$$Ipad = \frac{Vinp}{\omega_0 \cdot Lbal}$$

where $V_{inp}$ is the peak magnitude of the input alternating voltage as shown in FIG. 5.

The peak voltage over the primary coil is approximately given by:

$$Vpad = Vinp \cdot \frac{Lpad}{Lbal}$$

$V_{inp}$ is the magnitude of the fundamental frequency (sinusoidal component at $f_0$) generated by inverter 104. This may be considered to be equal to the inverter rail voltage multiplied by $2/\pi$.

FIG. 7 is a graph of simulation results showing the effect of the inductor ratio on the separation between the resonant peaks. The y-axis represents the separation between the peaks in frequency, divided by the centre frequency. The centre frequency is at the centre of the x-axis in FIG. 6. FIG. 8 is a graph of simulation results showing the effect of the inductance value of the ballast inductor 310 on the current (the primary current) in the primary coil 108.

Based on the above, an example design process for designing circuitry as in FIG. 5 might be, in one embodiment of the present invention, as follows:

Step 1: select the inductance value $L_{bal}$ of the ballast inductor 310 and the capacitance value $C_{tank}$ of the tank capacitance 312 so that the pair is tuned to frequency $f_0 = 1/(2\pi\sqrt{LC})$. Also, select the inductance value $L_{pad}$ of the primary coil 108 and the capacitance value $C_p$ of the series resonant capacitor 106 so that the pair is tuned to frequency $f_0$. Then, select frequency $f_0$ as the switching frequency of the inverter 104.

Step 2: select a value for the inductor ratio $L_{bal}/L_{pad}$ so that the resonant peaks are sufficiently far apart that the effect of component tolerances is substantially small. It is found that $L_{bal}/L_{pad} = 1/4$ approximately is a reasonable starting point.

Step 3: the expected voltage over the primary coil(s) 108 is thus approximately:

$$Vpad = Vinp \cdot \frac{Lpad}{Lbal}$$

The number of turns in the primary coil may be selected to work with practical inverter voltages, primary-coil voltages and primary-coil currents. Selection of inverter and coil voltages is typically affected by available FETs, efficiency requirements, cost and EMC (electromagnetic compatability) considerations. Design trade-offs may mean that the ratio selected in step 2 is adjusted accordingly.

Step 4: if appropriate, carry out fine-tuning of the overall design. For example, the resonant frequency of the ballast inductor 310 and tank capacitor 312 pair may be adjusted slightly to allow zero-voltage switching to be used by the inverter FETs under all tolerance conditions. The use of zero-voltage switching (ZVS) leads to low switching noise and reduced losses.

The above steps may need to be carried out somewhat together in practice, or partly iteratively. In practical implementations, there may be restrictions on the component values so that there may not be complete freedom of choice of component value.

Looking back over FIGS. 4 to 8, it may be appreciated that the primary coil has a self-inductance, $L_{pad}$ or $L_p$, which is the reactance of the coil in isolation (neglecting parasitics such as inter-winding capacitance). However, when this coil couples to a secondary coil in a secondary unit, the effective inductance may appear different and may be modified depending on the inductance of the secondary coil, $L_s$, the degree of coupling between the two coils and the impedance of the load imposed by the secondary unit. Thus the effective inductance seen may be different to the measured inductance in isolation. The effective inductance may vary depending on how strong the coupling is and may therefore be dependent on how closely aligned the primary and secondary coils are. It may also depend on the secondary load and may therefore vary over time. It is this effective inductance which generally determines the resonant frequency of the system. Thus, as in FIG. 4B, it may be that the frequency of operation is sometimes, or even often or always, different from the resonant frequency at that time, such that the system runs generally slightly "off resonance". A benefit of the circuitry in FIG. 4D may thus be that the system is deliberately run at a frequency between the two resonant peaks, i.e. it is designed to run off resonance. The system may thus be considered somewhat immune or desensitised to changes in the effective inductance seen (i.e. substantially stable).

FIG. 9 is a schematic diagram of a system 350 according to one embodiment of the present invention. System 350, similarly to system 300, includes a primary unit 352 and a plurality of secondary units 200.

Primary unit 352 is generally the same as primary unit 306, except that only two primary coils 108 are shown, and except that a specific example implementation of primary coil 108 is shown. Each primary coil 108 in primary unit 352 includes a bar-shaped piece of ferrite acting as a primary core 109 with turns of the corresponding primary coil 108 wound around it and distributed along its length. The secondary coils 202 in the secondary units 200 of system 350 also have a similar configuration. That is, the secondary coil 202 in each secondary unit 200 of FIG. 9 includes a bar-shaped piece of ferrite acting as a secondary core 203 with turns of the corresponding secondary coil 202 wound around it and distributed along its length.

In the present embodiment, the secondary coils 202 (and cores 203) are of slightly smaller dimensions than the primary coils 108 (and cores 109), giving some freedom of placement in the positioning of the device. In another embodiment of the present invention, the primary coils 108 could be the same size as (or slightly smaller than) the secondary coils.

In the present embodiment, the primary coils 108 are physically arranged such that they share a common coil axis, however they are arranged so that adjacent such primary coils have opposite polarities to each other. This is exemplified in FIG. 9 by the coil ends of the two shown primary coils 108 that are adjacent to one another being connected together in common and similarly the furthest-apart ends being connected together in common. An advantage of this layout is that the far-field electromagnetic field generated by the primary coils 108 may be cancelled to some extent, which can reduce interference caused by the primary unit 352. In this fashion, a larger number of primary coils 108 can be provided in a line with alternate polarities. In another embodiment of the present invention, the primary coils 108 could be arranged in a different manner, for example side-by-side. In other embodiments the primary coils may all have the same polarity, or the opposing polarities may be provided from separate out-of-phase driving systems.

The arrangement of the primary coils 108 in the present embodiment lends itself to the shelf format of the primary unit mentioned above. The line of primary coils 108 could sit under the shelf, rendering the shelf itself as a power transfer surface. Secondary units 200 could then be arranged on the shelf to receive power inductively therefrom.

FIG. 10 is a schematic diagram of a primary unit 362 according to one embodiment of the present invention. As mentioned before, the number of primary coils 108 provided in primary units presented herein may vary from embodiment to embodiment. With this in mind, primary unit 362 may, for example, be used interchangeably with primary units 302, 306 and 352.

Primary unit 362 differs from primary unit 306, as follows. Firstly, the circuitry portion including ballast circuit 308, capacitor 106 and one of the primary coils 108 is repeated per primary coil 108, and those portions are connected together in parallel. Secondly, the buffer 110 (peak detector) is only connected to one of the primary coils 108.

Accordingly, in primary unit 362, the ballast circuits are all connected to the inverter 104, such that inverter 104 drives them all simultaneously. This configuration of the primary unit 362 takes advantage of the benefits of the ballast circuit 308 discussed in detail above. That is, the inverter 104 is configured such that its fundamental output frequency is in the substantially flat portion of the frequency response curve for each of the parallel-connected portions. By configuring the parallel-connected portions such that they are mutually-similar to one another, it can be arranged that the substantially flat portion of the frequency response curve for each of the parallel-connected portions lies in approximately the same place in frequency. Therefore, the overall combination of the parallel-connected portions (and each such portion individually) is desensitized to changes on the secondary side (e.g. to the presence/absence of secondary unit 200, or the type of secondary unit 200). This is one reason why it is possible to regulate the voltage over each of the primary coils 108 whilst only sensing that voltage for one of those coils 108 (in this case, the uppermost coil 108). That is, by regulating operation of one of the primary coils 108, the operation of all of the primary coils 108 is regulated. It is advantageous, cost-wise and complexity-wise, to not need separate regulation circuitry per primary coil 108 (e.g. requiring a separate buffer 110 per coil 108 and a more complex MPU 112).

FIG. 11 is a schematic diagram of a primary unit 372 according to one embodiment of the present invention. Primary unit 372 may, for example, be used interchangeably with primary units 302, 306, 352, and 362.

Primary unit 372 is generally the same as primary unit 362 except that each primary coil 108 is provided with a feedback path via a buffer 110 (peak detector). Further, an MPU 374 with multiple inputs is provided instead of MPU 112.

Primary unit 372 is operable to sense the voltage over each of the primary coils 108 and to regulate its operation, in this case by controlling operation of DC/DC converter 102, in dependence upon any one or more of those sensed voltages. In certain circumstances, for example when only one secondary unit 200 is present, it can be advantageous to control regulation based upon the sensed voltage from a particular primary coil 108, for accuracy of control of that particular coil. In other circumstances, it may be advantageous to base regulation on the voltages over a different coil 108 at different times. Overall, a high capability in control is afforded in primary unit 372.

FIGS. 12 to 15 present schematic diagrams of primary units 382, 392, 402 and 412, respectively, each forming a different embodiment of the present invention. Each of these primary units may, for example, may be used interchangeably with any of the primary units 302, 306, 352, 362 and 372.

Each of the primary units 382, 392, 402 and 412 is generally the same as primary unit 302, except for the following differences. It will be appreciated that these embodiments are intended to demonstrate that the feedback signal (sensing operation of the circuitry) may be obtained at any of several different points in the primary-unit circuitry.

Figure 12:
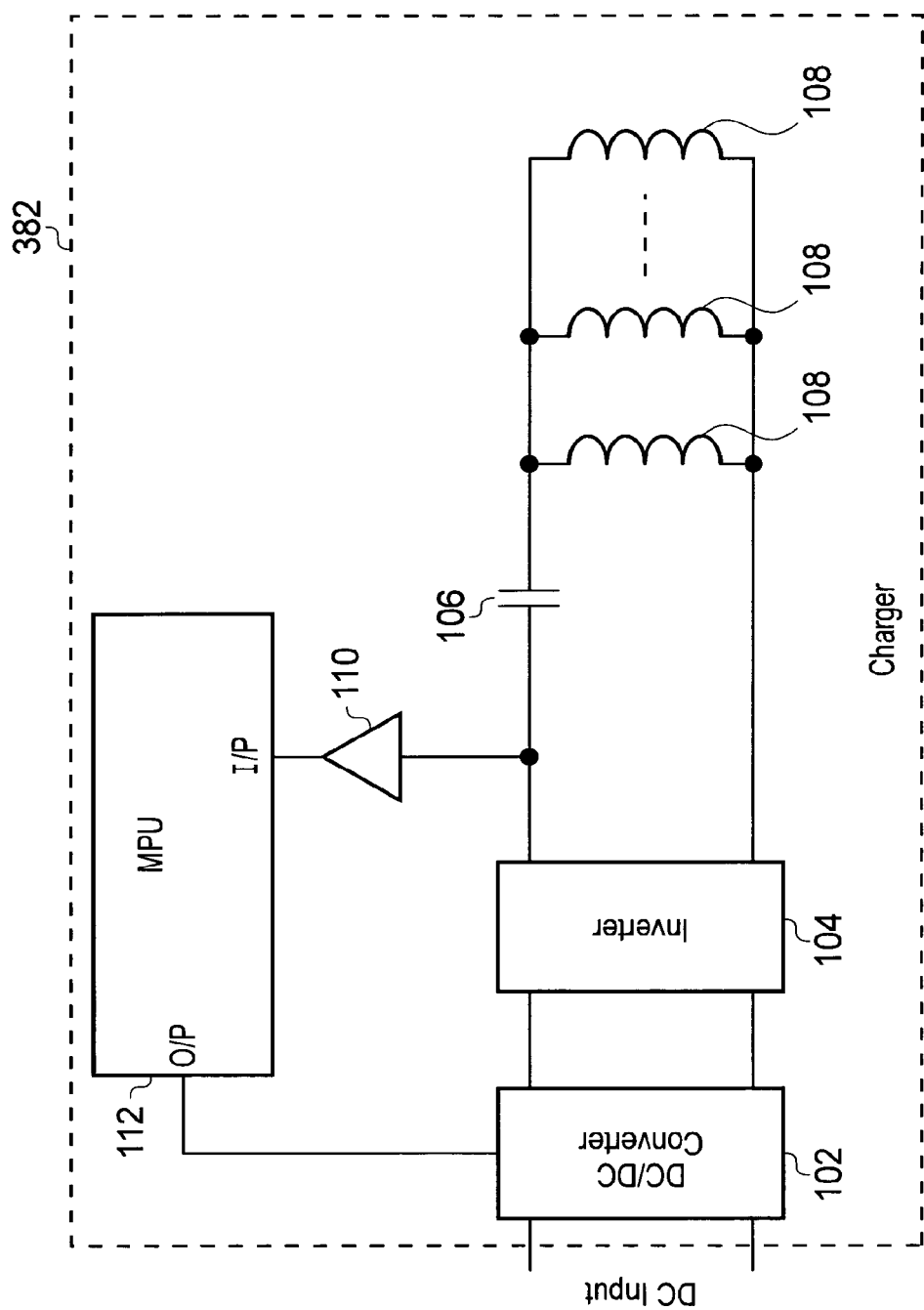
Figure 13:
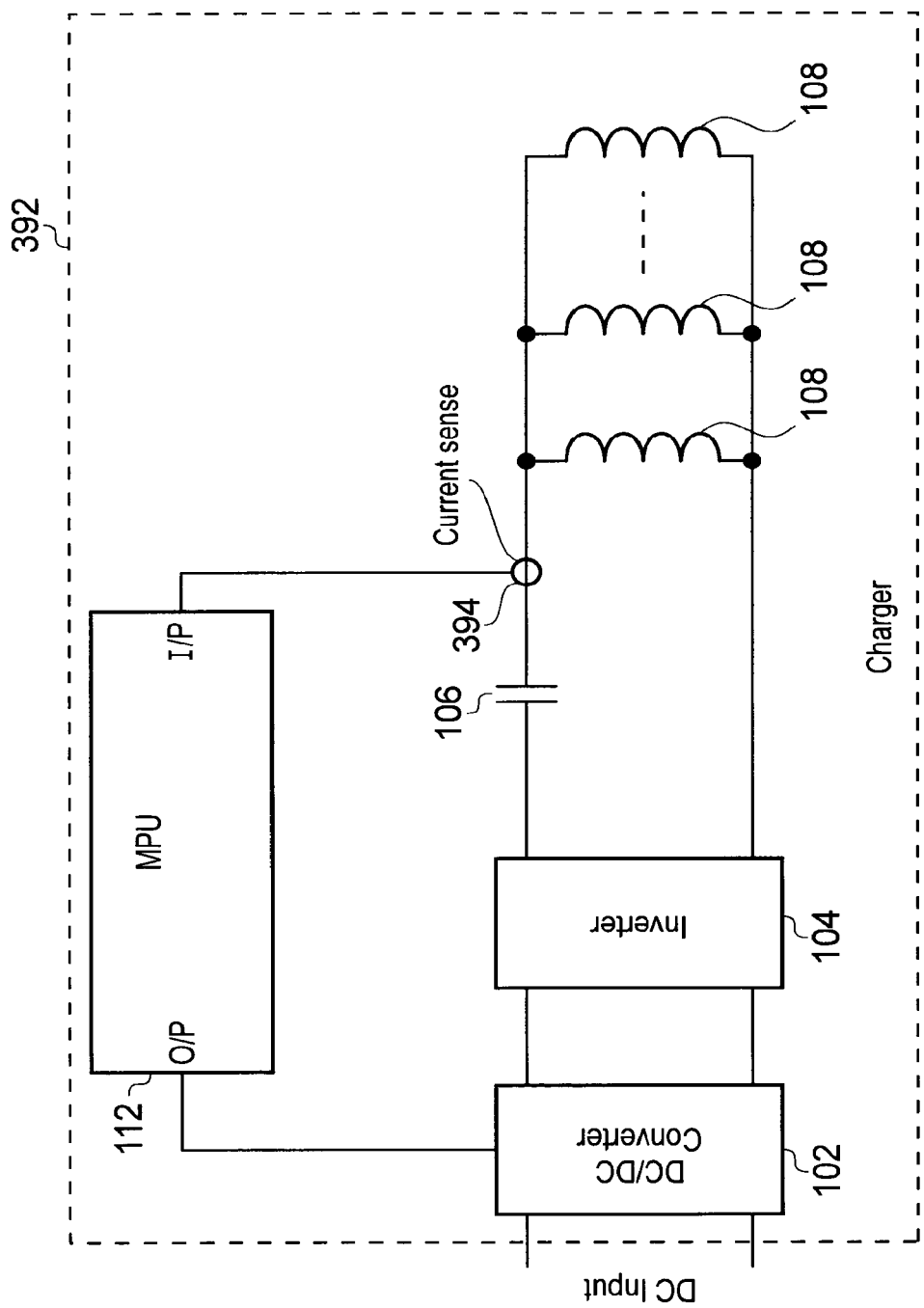
Figure 14:
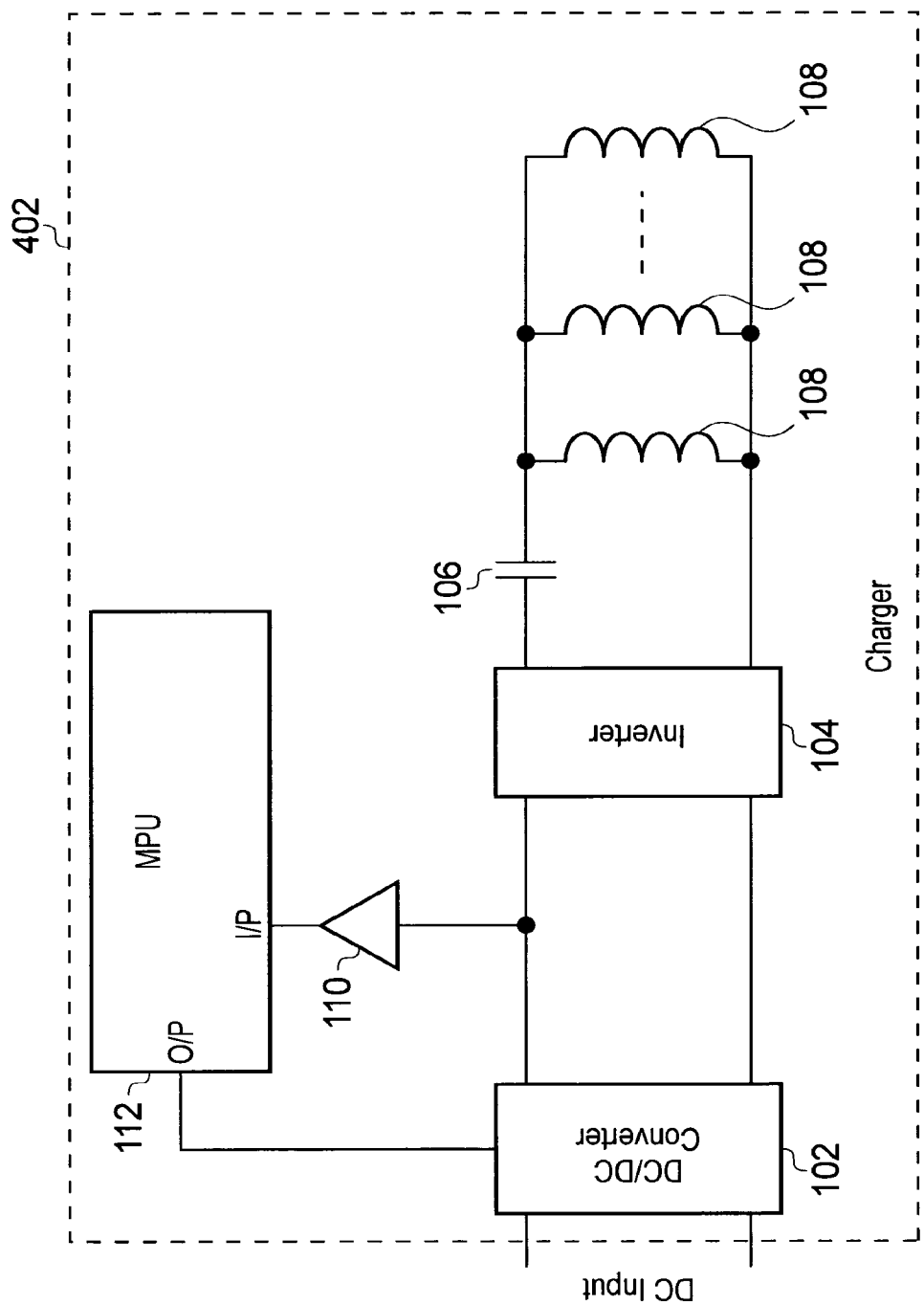
Figure 15:
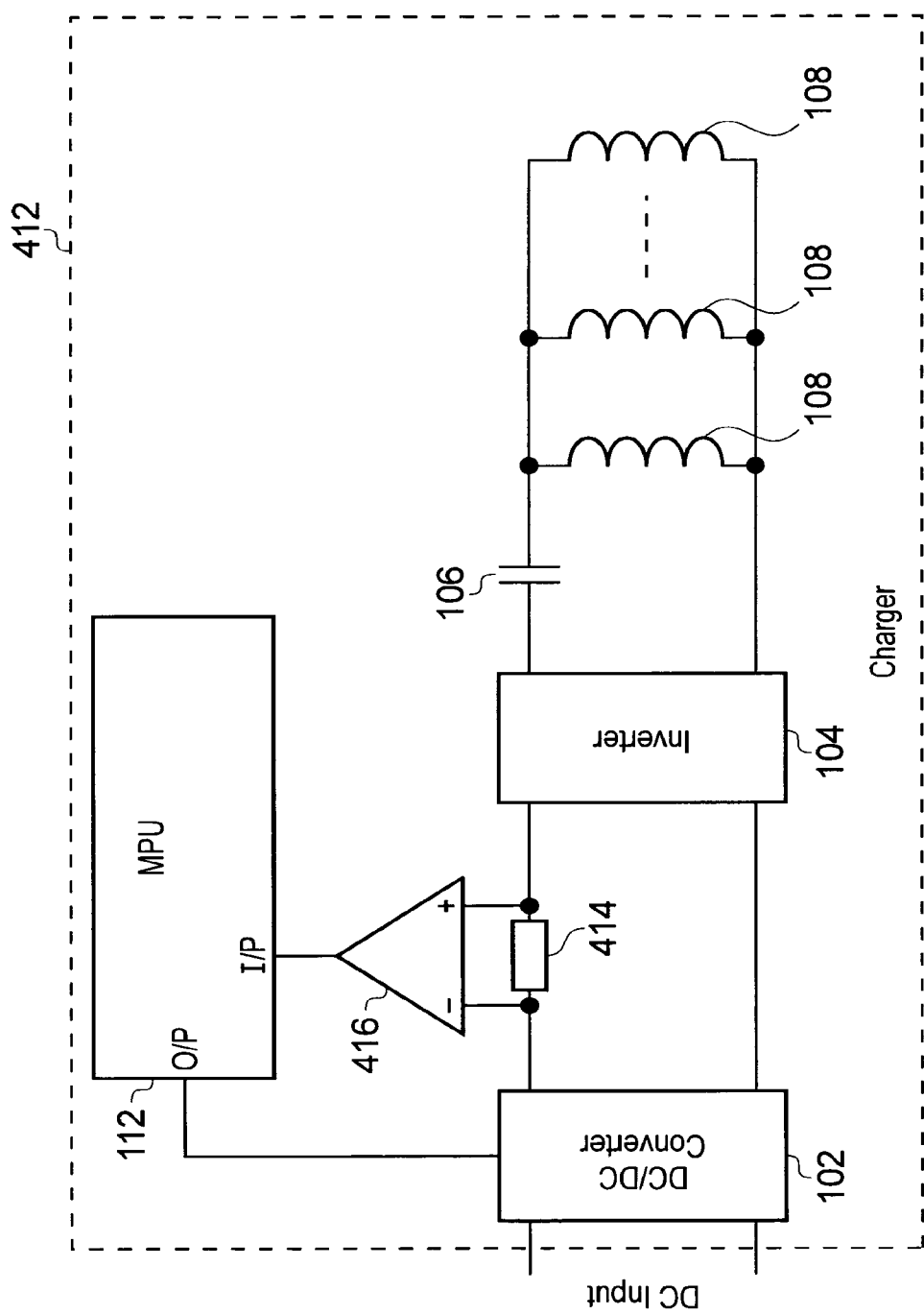

In primary unit 382 of FIG. 12, an AC voltage sense is provided as in primary unit 302 but from between the capacitor 106 and the inverter 104. In the primary unit 392 of FIG. 13, an AC current sensor 394 is provided at the primary coils (represented as a current transformer). In primary unit 402 of FIG. 14, a DC voltage sense is provided between the DC/DC converter 102 and the inverter 104. In primary unit 412 of FIG. 15, a DC current sense (formed by a series resistor 414 and an operational amplifier 416) is provided between the DC/DC converter 102 and the inverter 104.

FIG. 16 is a schematic diagram of a primary unit 422 according to one embodiment of the present invention. Primary unit 422 may, for example, be used interchangeably with any of primary units 302, 306, 352, 362, 372, 382, 392, 402 and 412.

Primary unit 422 is generally similar to primary unit 372, except that the parallel portions do not have ballast circuits (but another embodiment could include such ballast circuits), and that the capacitors 106 in each parallel portion are replaced with variable reactances (variable capacitors) 424. Further, primary unit 422 has an MPU 426 (instead of MPU 112) which has an input per voltage sense (via buffers 110) and an output per variable reactance 424 so as to control the value of those reactances.

Accordingly, in primary unit 422, each parallel portion has a primary coil 108 and variable reactance 424 connected together in series. Each variable reactance 424 is implemented in this embodiment as a variable capacitor, formed by an array of capacitors which may be switched in or out under control of the MPU 426. The variable capacitors may be fabricated using MOSFETs or MEMs by way of example. The value of the variable capacitors is controllable by the MPU 426.

As the capacitance value in the variable reactances 424 is varied, the LC combination (of the primary coil 108 and variable reactance 424) is tuned such that the combination may be brought in or out of resonance. In this way, the peak coil voltage concerned may be controllably varied, based upon tuning the resonant frequency of the LC combination towards or away from the fundamental frequency of the inverter 104.

Thus, in primary unit 422, the peak voltage in each primary coil 108 is sensed, and these feedback signals may be used by MPU 426 to control both the DC/DC converter 102 and the variable reactances 424. Each primary coil 108 may be regulated at a different voltage level. It will be understood that although embodiments disclosed herein focus on voltage sensing and regulation, other embodiments of the present invention may regulate current or power in the primary coils 108.

In primary unit 422, it is not essential for each of the primary coils 108 to have a variable reactance 424. For example, one of the primary coils 108 could have a fixed capacitor, such as capacitor 106, and the others could have variable reactances. The primary coils 108 could be regulated together by controlling the DC/DC converter 102, and the primary coils 108 could be regulated relative to one another (and the coil 108 with the fixed capacitor 106) by controlling the variable reactances 424. More generally, a variable impedance could be employed (incorporating a resistance), however the losses associated with the resistances (manifested as heat dissipation) may be undesirable in some embodiments.

FIG. 17 is a schematic diagram of a primary unit 432 according to one embodiment of the present invention. As before, primary unit 432 may be used interchangeably with previously-described primary units embodying the present invention.

Primary unit 432 is the same as primary unit 422, except that instead of the parallel portions being driven by common inverter 104, each such portion is driven by a half-bridge 434, with the half-bridges 434 being driven by a common driver 436 and oscillator 438.

Focusing on the LC combination in primary units 422 and 432, it will be appreciated that there are several ways of forming the variable capacitor (e.g. using varactors or various series and parallel combinations of capacitor). Alternatively, a fixed capacitor in series with a variable inductance could be used, since varying L or C will vary the overall LC combination. This could be realised with a switched array of individual conductors, or, for instance, by providing a coil wound around a ferrite rod, with taps in the coil, such that different sets of turns can be shorted or selected to alter the overall inductance.

FIG. 18 is a schematic diagram of a primary unit 442 according to one embodiment of the present invention. As before, primary unit 442 may be used interchangeably with previously-described primary units embodying the present invention.

Primary unit 442 is closely similar to primary unit 432, except that each parallel portion is provided with its own inverter 104 instead of the half-bridges 434 (and driver 436 and oscillator 438). Further, each of the variable reactances 424 is replaced with a fixed capacitor 106.

In order to provide controllability of each parallel portion, akin to that in FIG. 17, each inverter is provided with its own tunable oscillator 444 controllable by the MPU 426. Thus, the driving frequency (i.e. the fundamental output frequency of the inverter 104 concerned) provided to each primary coil 108 can be adjusted to bring it towards or away from resonance, thereby adjusting the AC voltage (peak voltage or, for example RMS voltage) across it. As in FIG. 17, the signal on each primary coil is sensed via a buffer (peak detector) 110, and the MPU 426 is operable to dynamically control the signals on its outputs to perform system control/regulation. Thus, the MPU 426 may selectively control operation of the DC/DC converter 102 and/or the operation of one ore more of the tunable oscillators 444. The MPU 426 is operable to dynamically regulate the voltage (or current or power, in other embodiments) in each of the primary coils 108, either all to the same level or to different levels, as desired.

As before, it is not necessary for each of the inverters 104 to be provided with its own tunable oscillator 444. For example, one of the inverters 104 could be provided with a fixed-frequency oscillator, and the others could have tunable oscillators 444. The primary coils 108 could be regulated together by controlling the DC/DC converter 102, and the primary coils 108 could be regulated relative to one another (and to the coil 108 with the fixed-frequency oscillator) by controlling the tunable oscillators 444.

FIGS. 19 and 20 are schematic diagrams of possible primary coil 108 layouts on the charging surfaces of primary units according to some embodiments of the present invention. In such embodiments, it is intended that a secondary unit 200 could be placed anywhere, or substantially anywhere, on such charging surfaces of primary units to be charged. In such cases, the primary unit concerned may include a plurality of primary coils.

In FIG. 19, the charging surface has an array of wound ferrite coils 450, i.e. an array of wound coils 450 on a ferrite back-plate 452. In FIG. 20, the charging surface has an array of printed hexagonal spiral coils 460 etched on to a PCB (printed circuit board) 462, which may have a ferrite and/or metal shield underneath. In FIG. 20, each hexagonal arrangement 460 may be considered to be an individual coil. Rectangles 464 represent the possible footprints of a secondary unit 200, or a secondary device incorporating such a secondary unit, placed on the charging surface of the primary unit concerned to be charged (i.e. to receive power inductively therefrom).

It will be appreciated that in some embodiments the footprint of the secondary unit 200 may be smaller than the charging area on the charging surface, such that multiple secondary units may be charged at the same time. In arrays such as those shown in FIGS. 19 and 20, it may be possible to switch primary coils 108 in and out, so that only certain coils are active at a particular time. When one primary coil 108 is switched out, it may be desirable to switch in an inductor (a dummy coil) instead, to retain the same overall inductance and keep the system on resonance. This concept could be applied by analogy to any of the previously described embodiments to form new embodiments of the present invention, and this concept is explored in more detail later herein. This concept may also be advantageous even if only a single secondary unit is receiving power, as different primary coils and even different numbers of primary coils may need to be active depending on the position and/or orientation of the secondary unit with respect to the charging surface. Therefore, depending on such position/orientation, different dummy coils or different numbers of dummy coils may need to be active at different times to maintain system resonance.

The "dummy coils" may be standard inductors, which may be smaller and lighter than primary coils. Further, they may be shielded or designed not to radiate so as not to affect the electromagnetic field generated by the primary coils. The dummy coils may be located in the primary unit away from the power transfer area so as to minimise any effect from them (heat, radiation, or otherwise). Thus, it may be possible to maintain the inductance seen from the driving circuitry using dummy coils, without those dummy coils affecting the electromagnetic field generated.

FIG. 21 is a schematic diagram of a primary unit 472 according to one embodiment of the present invention. As before, primary unit 472 may be used interchangeably with any of the previously-described primary units embodying the present invention.

As mentioned above, the "dummy coil" concept could be applied to any of the previously-described embodiments, and primary unit 472 is one example of this concept as applied to primary unit 306 of FIG. 3.

As can be seen from FIG. 21, each of the primary coils 108 is provided in series with a switch 474, so that it may be switched (for example under control of the MPU 112) in or out. In parallel with the primary coils 108 (and switches 474) there are provided corresponding inductors 476 (acting as dummy coils) connected in series with switches 478. Thus, as one primary coil 108 is switched out, an inductor (dummy coil) 476 may be switched in, in order to maintain the same overall inductance of the parallel arrangement of primary coils 108 and inductors 476.

The above explanation assumes a 1:1 relationship between the inductance of the primary coils 108 and the inductors (dummy coils) 476, such that one can be connected in to replace the other in the circuitry. A further assumption when considering primary unit 472 is that the same number of primary coils 108 and inductors (dummy coils) 476 are provided. Although this is true of one embodiment of the present invention, it is not true for other embodiments. For example, in one embodiment of the present invention it may be known that at any one time only up to a particular number of primary coils 108 will be switched out. In that case, it may be possible to only provide that particular number of inductors 476 (which number may be smaller than the number of primary coils 108). Also, for example, in another embodiment of the present invention it may be known that when primary coils 108 are switched out there will always be at least a particular number of them switched out. In that case, it may be possible to configure one of the inductors (dummy coils) 476 such that it has the same inductance as that particular number of primary coils 108 (which number may be greater than 1). It will be appreciated that other arrangements of primary coils 108 and inductors (dummy coils) 476 are possible, forming further embodiments of the present invention.

FIG. 22 is a schematic diagram of a primary unit 482 representing a number of embodiments of the present invention.

Primary unit 482 is intended to generically demonstrate how the concept of switching in and out primary coils 108 and inductors (dummy coils) 476 can be applied to embodiments of the present invention. Primary unit 482 includes an array of primary coils 108 and inductors 476, a driver 484 and a switch unit 486. The primary coils 108 and inductors 476 are commonly connected at one end via the switch unit 486 to a ground terminal in the driver 484. The other end of each of the primary coils 108 and inductors 476 is selectively connectable under control of the switch unit 486 to either output 1 or output 2 of the driver 484. As will become apparent, the driver 484 could have any number of outputs, and only two are shown for convenience.

The configuration of primary unit 482 is generally applicable to primary-unit embodiments disclosed herein. For example, the primary coils 108 could be the array in FIG. 19 or 20. Also, for example, considering driver 484 with only one output (or with other outputs unconnected), the primary coils 108 and inductors 476 could be those in FIG. 21, the switch unit 486 could be the combination of switches of 474 and 478 in FIG. 21, and the driver 484 could be the remaining parts of the circuitry in FIG. 21, with the driver output being between the capacitor 106 and buffer 110 in FIG. 21.

The benefit of providing more than one output in the driver 484 is that the primary coils 108 and inductors 476 can be controlled in sets, one set per output, such that (for example) one set could be regulated at a different voltage to another. As exemplified in FIG. 22, any number of the primary coils 108 and inductors 476 could be connected to any of the driver outputs.

FIG. 23 is a schematic diagram of a driver 492 which may be interchanged with driver 484 to form an embodiment of the present invention. It will be appreciated that driver 492 is the same as primary unit 492 of FIG. 23, except that the primary coils 108 have been removed leaving outputs 1 and 2, and that the remaining lower outputs of the half-bridges 434 are connected together in common for compatibility with the common ground in FIG. 22. Accordingly, it is understood that one set of primary coils 108 (or inductors 476) may be regulated at one voltage (via output 1), and another set of primary coils 108 (or inductors 476) may be regulated at another voltage (via output 2). Again, as before, regulation could be voltage, current or power regulation.

Having different primary coils 108 regulated to different primary-coil voltages can be useful for supplying different levels of power to different loads (e.g. different types of secondary unit 200 or secondary device) which are on the same charging surface, or, at least, receiving power inductively from the same primary unit. This can also be useful because the coupling between primary unit and secondary unit can vary widely depending on the position and/or orientation of the secondary unit relative to the primary unit. Moreover, tolerances in practical capacitors and inductors can result in differences from one secondary unit or device to the next.

This variation in coupling can result in secondary units/devices having to cope with a large voltage input range, and it is generally desirable to restrict the voltage range that a secondary unit/device has to cope with such that it may include lower voltage-rated components, thereby reducing cost and improving efficiency. With this in mind, in one embodiment of the present invention, the primary and secondary units could be configured to communicate with one another. For example, a secondary device in one embodiment of the present invention could be configured to communicate to the primary unit information indicative of its power of requirement. In response, the primary unit could be configured to regulate the relevant primary coils accordingly. It will be recognised that in some embodiments such communication may only need to be one-way communication, for example from secondary unit to primary unit, although more robust communication may take advantage of two-way communication.

FIG. 24 is a schematic diagram of a primary unit 502 according to one embodiment of the present invention. Primary unit 502 is an example implementation of primary unit 582, in which banks of primary coils 108 and inductors (dummy coils) 476 are shown separately (as in FIG. 21) and in which an example implementation of switch unit 486 is explicitly shown. Further, it is shown that control of the switch unit 486 could be handled by an MPU 504, which may be part of or separate from the MPUs shown in the other embodiments of the present invention disclosed herein.

In one embodiment of the present invention, akin to that in FIG. 18, it may be advantageous to controllably vary the driving frequency on the primary unit. This may be useful, for example, if secondary units do not include DC/DC converters and instead communicate feedback information to the primary unit. For example, in one embodiment a primary unit could potentially drive a primary coil or coils for one secondary unit at one frequency and a different primary coil or coils for a different secondary unit at a different frequency in dependence upon feedback signals from those secondary units. In this regard at least, some embodiments may obtain feedback signals from the secondary side (as well as, or instead as, feedback signals from the primary side).

It will be appreciated that other embodiments of the present invention are possible within the scope of the appended claims.

The invention claimed is:

1. A primary unit for transferring wireless power to a secondary unit, said primary unit comprising:
a primary circuit;
a desensitizing circuit electrically coupled to said primary circuit;
driving circuitry operable to drive said primary circuit and said desensitizing circuit at an operating frequency to generate an electromagnetic field for transfer of wireless power to the secondary unit;

wherein said primary circuit and said desensitizing circuit are configured such that at least one of voltage and current of said wireless power does not vary significantly in response to changes in coupling between said primary unit and the secondary unit.

2. The primary unit of claim 1 wherein said primary unit is desensitized to changes in its relationship with the secondary unit.

3. The primary unit of claim 1 wherein said primary unit is desensitized to changes in its relationship between a plurality of different secondary units.

4. The primary unit of claim 1 wherein said operating frequency is variable.

5. The primary unit of claim 1 wherein said primary circuit includes a primary inductor and said desensitizing circuit includes a desensitizing inductor, and wherein said primary circuit and said desensitizing circuit are configured such that at least one of voltage and current of said wireless power does not vary significantly in response to changes in coupling between said primary unit and the secondary unit by selection of said primary inductor value and selection of said desensitizing inductor value.

6. The primary unit of claim 1 wherein said primary circuit and said desensitizing circuit are configured to have a frequency response when driven and wherein a portion of said frequency response near said operating frequency remains substantially stable despite changes to coupling between said primary unit and the secondary unit.

7. A primary unit for transferring wireless power to a secondary unit, said primary unit comprising:
   a primary circuit and a desensitizing circuit configured to provide a frequency response when driven, wherein said desensitizing circuit is electrically coupled to said primary circuit;
   driving circuitry operable to drive said primary circuit and desensitizing circuit at an operating frequency to generate an electromagnetic field for transfer of wireless power to the secondary unit;
   wherein a portion of said frequency response near said operating frequency remains substantially stable despite changes to coupling between said primary unit and the secondary unit.

8. The primary unit of claim 7 wherein said primary unit is desensitized to changes in its relationship with the secondary unit.

9. The primary unit of claim 7 wherein said primary unit is desensitized to changes in its relationship between a plurality of different secondary units.

10. The primary unit of claim 7 wherein said operating frequency is variable.

11. The primary unit of claim 7 wherein said primary circuit and said desensitizing circuit are configured such that at least one of voltage and current of said wireless power does not vary significantly in response to changes in coupling between said primary unit and the secondary unit.

12. The primary unit of claim 7 wherein said primary circuit includes a primary inductor and said desensitizing circuit includes a desensitizing inductor, and wherein said primary circuit and said desensitizing circuit are configured such that at least one of voltage and current of said wireless power does not vary significantly in response to changes in coupling between said primary unit and the secondary unit by selection of said primary inductor value and selection of said desensitizing inductor value.

13. A primary unit for transferring wireless power to a secondary unit, said primary unit comprising:
   a primary circuit including a primary inductor having an inductance value and a desensitizing inductor having an inductance value, wherein said primary unit has an effective inductance of which said primary inductor inductance value and said desensitizing circuit inductor contribute to said effective inductance, wherein said desensitizing inductor is electrically coupled to said primary inductor;
   driving circuitry operable to drive said primary circuit to generate an electromagnetic field for transferring wireless power to the secondary unit; and
   wherein said inductance value of said primary inductor and said inductance value of said desensitizing circuit inductor are selected such that a change in said effective inductance due to coupling between said primary inductor and the said secondary unit is substantially small.

14. The primary unit of claim 13 wherein said primary unit is desensitized to changes in its relationship with the secondary unit.

15. The primary unit of claim 13 wherein said primary unit is desensitized to changes in its relationship between a plurality of different secondary units.

16. The primary unit of claim 13 wherein said primary circuit is configured such that at least one of voltage and current of said wireless power does not vary significantly in response to changes in coupling between said primary unit and the secondary unit.

17. The primary unit of claim 13 wherein said primary circuit is configured to have a frequency response when driven and wherein a portion of said frequency response near said operating frequency remains substantially stable despite changes to coupling between said primary unit and the secondary unit.

18. A primary unit for transferring wireless power to one or more secondary units, said primary unit comprising:
   a primary circuit;
   a desensitizing circuit, wherein said desensitizing circuit is electrically coupled to said primary circuit;
   driving circuitry operable to drive said primary circuit and said desensitizing circuit at an operating frequency to generate an electromagnetic field for transfer of wireless power to the one or more secondary units, wherein coupling between said primary circuit and the one or more secondary units falls within a range of coupling values;
   wherein said primary circuit and said desensitizing circuit are configured such that variations in said coupling within said range of coupling values do not significantly vary output from said primary unit.

19. The primary unit of claim 18 wherein said primary circuit and said desensitizing circuit are configured to have a first frequency response at a first coupling value when driven by the driving circuitry at said operating frequency, wherein said primary circuitry and said desensitizing circuit are configured to have a second frequency response at a second coupling value when driven by the driving circuitry at said operating frequency, and wherein said first frequency response and said second frequency response at said operating frequency are substantially similar.

20. The primary unit of claim 18 wherein said primary unit is desensitized to changes in its relationship with the secondary unit.

21. The primary unit of claim 18 wherein said primary unit is desensitized to changes in its relationship between a plurality of different secondary units.

22. The primary unit of claim 18 wherein said operating frequency is variable.

23. The primary unit of claim 18 wherein said primary circuit includes a primary inductor and said desensitizing circuit includes a desensitizing inductor, and wherein said primary circuit and said desensitizing circuit are configured such that at least one of voltage and current of said wireless power does not vary significantly in response to changes in coupling between said primary unit and the secondary unit by selection of said primary inductor value and selection of said desensitizing inductor value.

24. The primary unit of claim 18 wherein said primary circuit and said desensitizing circuit are configured to have a frequency response when driven and wherein a portion of said frequency response near said operating frequency remains substantially stable despite changes to coupling between said primary unit and the one or more secondary units.

* * * * *